(12) United States Patent
Shikanai

(10) Patent No.: US 11,377,081 B2
(45) Date of Patent: Jul. 5, 2022

(54) BRAKE PEDAL STRUCTURE FOR SADDLED VEHICLE

(71) Applicant: HONDA MOTOR CO., LTD., Tokyo (JP)

(72) Inventor: Shimpei Shikanai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 362 days.

(21) Appl. No.: 16/785,160

(22) Filed: Feb. 7, 2020

(65) Prior Publication Data

US 2020/0298810 A1    Sep. 24, 2020

(30) Foreign Application Priority Data

Mar. 18, 2019   (JP) .............................. JP2019-050382

(51) Int. Cl.
  *B60T 11/18*  (2006.01)
  *B62L 3/04*  (2006.01)
(52) U.S. Cl.
  CPC ................. *B60T 11/18* (2013.01); *B62L 3/04* (2013.01)
(58) Field of Classification Search
  CPC .................................... B62L 3/04; B60T 11/18
  See application file for complete search history.

(56) References Cited

U.S. PATENT DOCUMENTS

2012/0145493 A1   6/2012  Nishikawa et al.

FOREIGN PATENT DOCUMENTS

| CN | 201106646 Y | 8/2008 | |
|---|---|---|---|
| CN | 102556023 A | 7/2012 | |
| CN | 202557719 U | 11/2012 | |
| DE | 103 01 184 B4 | 8/2004 | |
| EP | 3127797 A1 * | 2/2017 | ............. B60K 11/00 |
| JP | 5-105167 A | 4/1993 | |
| JP | 03219805 B2 * | 10/2001 | |

(Continued)

OTHER PUBLICATIONS

Chinese Office Action and Search Report for Chinese Application No. 202010180419.5, dated Apr. 1, 2021, with English translation of the Office Action.

(Continued)

*Primary Examiner* — Melanie Torres Williams
(74) *Attorney, Agent, or Firm* — Birch, Stewart, Kolasch & Birch, LLP

(57) ABSTRACT

A brake pedal structure for a saddled vehicle is configured to include a master cylinder supplying hydraulic pressure to a brake caliper of the saddled vehicle and a brake pedal connected to the master cylinder through a connection mechanism. The connection mechanism includes a holder, an arm, and a connection pin. The holder presses the master cylinder, the arm is fixed to the brake pedal, and the connection pin pivotally supports the holder and the arm so as to be swingable against each other. The connection pin includes a small diameter shaft, a large diameter shaft, and an arm support shaft. The small diameter shaft and the large diameter shaft are pivotally supported by the holder and have a circular cross section. The arm support shaft is pivotally supported by the arm and has a circular cross section. The arm support shaft is eccentric with respect to the small diameter shaft and the large diameter shaft.

19 Claims, 18 Drawing Sheets

(56) References Cited

FOREIGN PATENT DOCUMENTS

| JP | 2015193349 A | * | 11/2015 | | |
|---|---|---|---|---|---|
| JP | 2016175442 A | * | 10/2016 | ................ | B60T 7/06 |
| JP | 2017-165175 A | | 9/2017 | | |
| WO | WO 2017/057594 A1 | | 4/2017 | | |

OTHER PUBLICATIONS

Indian Office Action for Indian Application No. 202014008842, dated Jun. 30, 2021, with an English translation.

* cited by examiner

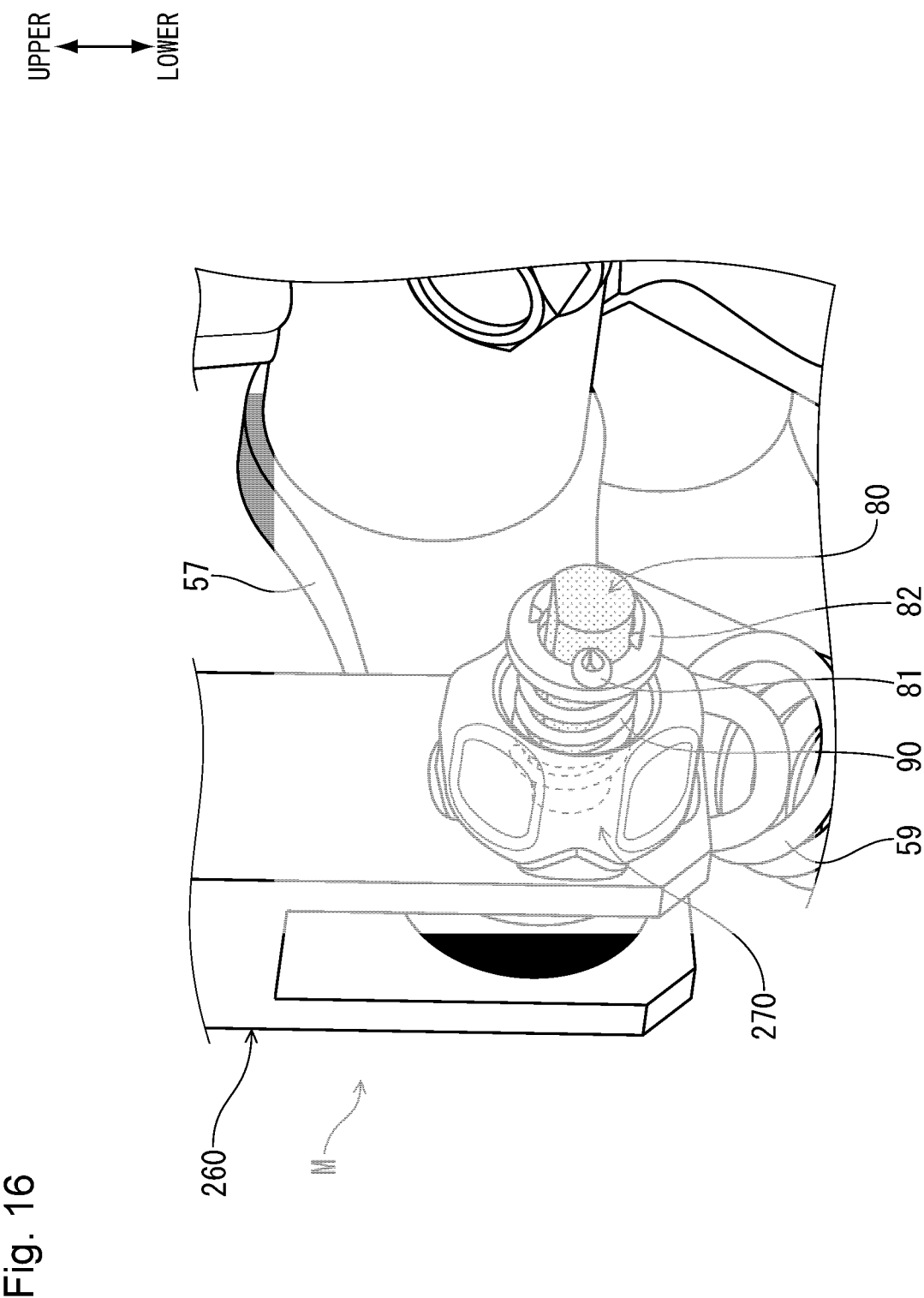

US 11,377,081 B2

BRAKE PEDAL STRUCTURE FOR SADDLED VEHICLE

TECHNICAL FIELD

The present invention relates to a brake pedal structure for a saddled vehicle, and relates specifically to a brake pedal structure for a saddled vehicle allowing an occupant to operate the brake structure by his/her foot for activation.

BACKGROUND ART

Conventionally, there has been known a configuration of allowing the height of the pedal stepping portion to be changed corresponding to the physical size of the occupant, the kind of the boots, and so on in a brake pedal for a saddled vehicle in which the pedal stepping portion is disposed on the front side of the vehicle body of the step bar on which the occupant places his/her foot.

Patent Document 1 discloses a brake pedal for a motorcycle allowing the height of the pedal stepping portion to be adjusted in two stages employing a vertically two-layered structure for the pedal stepping portion of the brake pedal disposed on the right side in the vehicle width direction with the upper pedal stepping portion being made a foldable type.

CITATION LIST

Patent Literature

Patent Document 1: DE 10301184 B4

SUMMARY OF INVENTION

Technical Problem

However, according to the configuration of Patent Document 1, there were such problems that the foldable type pedal stepping portion was added to an ordinary brake pedal and thereby the number of pieces of components and the weight increased, and that the position of the pedal stepping portion changed with respect to the brake pedal which affected the feeling of operation.

The object of the present invention is to provide a brake pedal structure for a saddled vehicle which can solve the problem of the prior art described above and can adjust the height of the pedal stepping portion with a compact and light-weight configuration without affecting the feeling of operation.

Solution to Problem

To achieve the afore-mentioned object, the present invention has a first feature in that a brake pedal structure for a saddled vehicle comprises a master cylinder (54) supplying hydraulic pressure to a brake caliper (34) of a saddled vehicle (1), and a brake pedal (50) connected to the master cylinder (54) through a connection mechanism (M), wherein the connection mechanism (M) includes a holder (60, 260), an arm (57), and a connection pin (80), the holder (60, 260) pressing the master cylinder (54), the arm (57) being fixed to the brake pedal (50), the connection pin (80) pivotally supporting the holder (60, 260) and the arm (57) so as to be swingable against each other, the connection pin (80) includes holder support shafts (84, 86) and an arm support shaft (85), the holder support shafts (84, 86) being pivotally supported by the holder (60, 260) and having a circular cross section, the arm support shaft (85) being pivotally supported by the arm (57) and having a circular cross section, and the arm support shaft (85) is eccentric with respect to the holder support shafts (84, 86).

To achieve the afore-mentioned object, the present invention has a second feature in that the connection pin (80) is engaged with an operation member (70, 270) that is slidable in an axial direction and non-turnable in a circumferential direction, the holder (60, 260) is provided with a turning restriction portion (61, 264) restricting turning of the operation member (70, 270), and the operation member (70, 270) is biased toward the holder (60, 260) by a biasing member (90).

To achieve the afore-mentioned object, the present invention has a third feature in that the connection pin (80) has an end formed with an extension portion (83) having a generally D-shape cross section, and the operation member (70, 270) is formed with an opening (74, 272) having a generally D-shape matching the cross-sectional shape of the extension portion (83).

To achieve the afore-mentioned object, the present invention has a fourth feature in that the holder support shafts (84, 86) are configured with a large diameter shaft (86) and a small diameter shaft (84) having a same turning axis, a large diameter opening (65) and a small diameter opening (64) are formed in the holder (60, 260) in each of two side walls (62) opposing with each other, the large diameter shaft (86) being inserted to the large diameter opening (65), the small diameter shaft (84) being inserted to the small diameter opening (64), and the arm support shaft (85) is disposed between the large diameter shaft (86) and the small diameter shaft (84), and is disposed within a range of a contour of the large diameter shaft (86) in an axial view.

To achieve the afore-mentioned object, the present invention has a fifth feature in that the operation member (70, 270) is disposed on an outer side in a vehicle width direction of the holder (60, 260).

To achieve the afore-mentioned object, the present invention has a sixth feature in that a hook (88) for connecting an operation element (92) of a brake switch (93) is arranged at an axis position on a surface on an inner side in the vehicle width direction of the large diameter shaft (86).

To achieve the afore-mentioned object, the present invention has a seventh feature in that the turning restriction portion (61) has a shape of arranging a step on a side wall (62) of the holder (60), the operation member (70) is configured to arrange a bottom surface portion (73) and a side surface portion (72) by bending a plate-like member, the bottom surface portion (73) abutting upon the side wall (62), the side surface portion (72) abutting upon the turning restriction portion (61), and turning of the operation member (70) is restricted by that the side surface portion (72) or an end surface of the bottom surface portion (73) opposes the turning restriction portion (61).

To achieve the afore-mentioned object, the present invention has an eighth feature in that the turning restriction portions (264) are protrusions disposed on a side wall (261) of the holder (260) so as to form a concentric circle, engagement recesses (274) are arranged in a bottom surface portion (275) of the operation member (270), the engagement recesses (274) matching a shape of the turning restriction portions (264), and turning of the operation member (270) is restricted by engaging the turning restriction portions (264) with the engagement recesses (274).

Advantageous Effects of Invention

According to the first feature of the present invention, a brake pedal structure for a saddled vehicle comprises a master cylinder (54) supplying hydraulic pressure to a brake caliper (34) of a saddled vehicle (1), and a brake pedal (50) connected to the master cylinder (54) through a connection mechanism (M), wherein the connection mechanism (M) includes a holder (60, 260), an arm (57), and a connection pin (80), the holder (60, 260) pressing the master cylinder (54), the arm (57) being fixed to the brake pedal (50), the connection pin (80) pivotally supporting the holder (60, 260) and the arm (57) so as to be swingable against each other, the connection pin (80) includes holder support shafts (84, 86) and an arm support shaft (85), the holder support shafts (84, 86) being pivotally supported by the holder (60, 260) and having a circular cross section, the arm support shaft (85) being pivotally supported by the arm (57) and having a circular cross section, and the arm support shaft (85) is eccentric with respect to the holder support shafts (84, 86). Therefore, the initial angle of the brake pedal can be changed by turning the connection pin included in the connection mechanism connecting the master cylinder and the brake pedal. Thus, such brake pedal can be obtained that the height of the pedal stepping portion can be adjusted while suppressing increase of the weight of the brake pedal side. Also, because the positional relation between the brake pedal and the pedal stepping portion does not change even when the height of the pedal stepping portion may be changed, the impact on the feeling of operation of the brake pedal is reduced.

According to the second feature of the present invention, the connection pin (80) is engaged with an operation member (70, 270) that is slidable in an axial direction and non-turnable in a circumferential direction, the holder (60, 260) is provided with a turning restriction portion (61, 264) restricting turning of the operation member (70, 270), and the operation member (70, 270) is biased toward the holder (60, 260) by a biasing member (90). Therefore, such configuration is achieved that the connection pin can be turned by gripping the operation member without using a tool and the like and that the connection pin is not turned unless the operation member is operated intentionally. To be more specific, turning of the operation member is forbidden by the turning restriction portion in a state the operation member is not operated, whereas the operation member can be turned when the operation member is made to depart from the turning restriction portion resisting the biasing force of the biasing member. Also, the number of pieces of components can be reduced by forming the holder and the turning restriction portion in an integral manner, and the degree of freedom of design of the turning restriction portion can be increased by forming the both parties separately.

According to the third feature of the present invention, the connection pin (80) has an end formed with an extension portion (83) having a generally D-shape cross section, and the operation member (70, 270) is formed with an opening (74, 272) having a generally D-shape matching the cross-sectional shape of the extension portion (83). Therefore, the connection pin and the operation member can be made to slide against each other in the axial direction and can be engaged so as not to be rotatable in the circumferential direction by the simple configuration of engaging the D-shape cross section and the D-shape opening. Also, the D-shape is easily worked and can prevent deterioration of the strength of the connection pin and the operation member.

According to the fourth feature of the present invention, the holder support shafts (84, 86) are configured with a large diameter shaft (86) and a small diameter shaft (84) having a same turning axis, a large diameter opening (65) and a small diameter opening (64) are formed in the holder (60, 260) in each of two side walls (62) opposing with each other, the large diameter shaft (86) being inserted to the large diameter opening (65), the small diameter shaft (84) being inserted to the small diameter opening (64), and the arm support shaft (85) is disposed between the large diameter shaft (86) and the small diameter shaft (84), and is disposed within a range of a contour of the large diameter shaft (86) in an axial view. Therefore, the connection pin can be assembled to the holder from the large diameter opening side, the holder including the large and small pivot holes in two side walls that oppose with each other, and assembly work of the connection mechanism becomes easy. Also, by disposing the arm support shaft between the large diameter shaft and the small diameter shaft, the arm support shaft having the intermediate diameter between the large diameter and the small diameter, the connection pin can be configured as an integral component, the production cost can be reduced, and the assembling performance can be improved.

According to the fifth feature of the present invention, the present invention has a fifth feature in that the operation member (70, 270) is disposed on an outer side in a vehicle width direction of the holder (60, 260). Therefore, the operation member is easily accessible from the vehicle body outer side, and the height of the brake pedal can be adjusted easily.

According to the sixth feature of the present invention, a hook (88) for connecting an operation element (92) of a brake switch (93) is arranged at an axis position on a surface on an inner side in the vehicle width direction of the large diameter shaft (86). Therefore, the position of the connection portion does not change even when the connection pin is turned, thereby it is not necessary to adjust the activation start position of the brake switch whenever the height of the pedal stepping portion is adjusted, and usability improves. Also, the protrusion of the connection pin is hardly visible from the outer side, and the impact on the appearance is reduced.

According to the seventh feature of the present invention, the turning restriction portion (61) has a shape of arranging a step on a side wall (62) of the holder (60), the operation member (70) is configured to arrange a bottom surface portion (73) and a side surface portion (72) by bending a plate-like member, the bottom surface portion (73) abutting upon the side wall (62), the side surface portion (72) abutting upon the turning restriction portion (61), and turning of the operation member (70) is restricted by that the side surface portion (72) or an end surface of the bottom surface portion (73) opposes the turning restriction portion (61). Therefore, turning operation of the connection pin can be effected by the operation member having a simple shape of folding the sheet-like member, and turning of the connection pin can be restricted by the turning restriction portion that forms the step. Also, it becomes easy to make the stop position of the operation member four positions.

According to the eighth feature of the present invention, the turning restriction portions (264) are protrusions disposed on a side wall (261) of the holder (260) so as to form a concentric circle, engagement recesses (274) are arranged in a bottom surface portion (275) of the operation member (270), the engagement recesses (274) matching a shape of the turning restriction portions (264), and turning of the operation member (270) is restricted by engaging the turning restriction portions (264) with the engagement recesses (274). Therefore, turning operation of the connection pin can be effected by the operation member having a simple shape, and turning of the connection pin can be restricted because the protrusion as the turning restriction portion engages with the engagement recess that is arranged in the operation member. Also, by increasing the number of pieces of the protrusion as the turning restriction portion and the engagement recess of the operation member, the stop position of the operation member can be increased.

BRIEF DESCRIPTION OF DRAWINGS

FIG. 16 is a perspective view of the connection mechanism related to the second modification of the present embodiment.

DESCRIPTION OF EMBODIMENT

Figure 1:
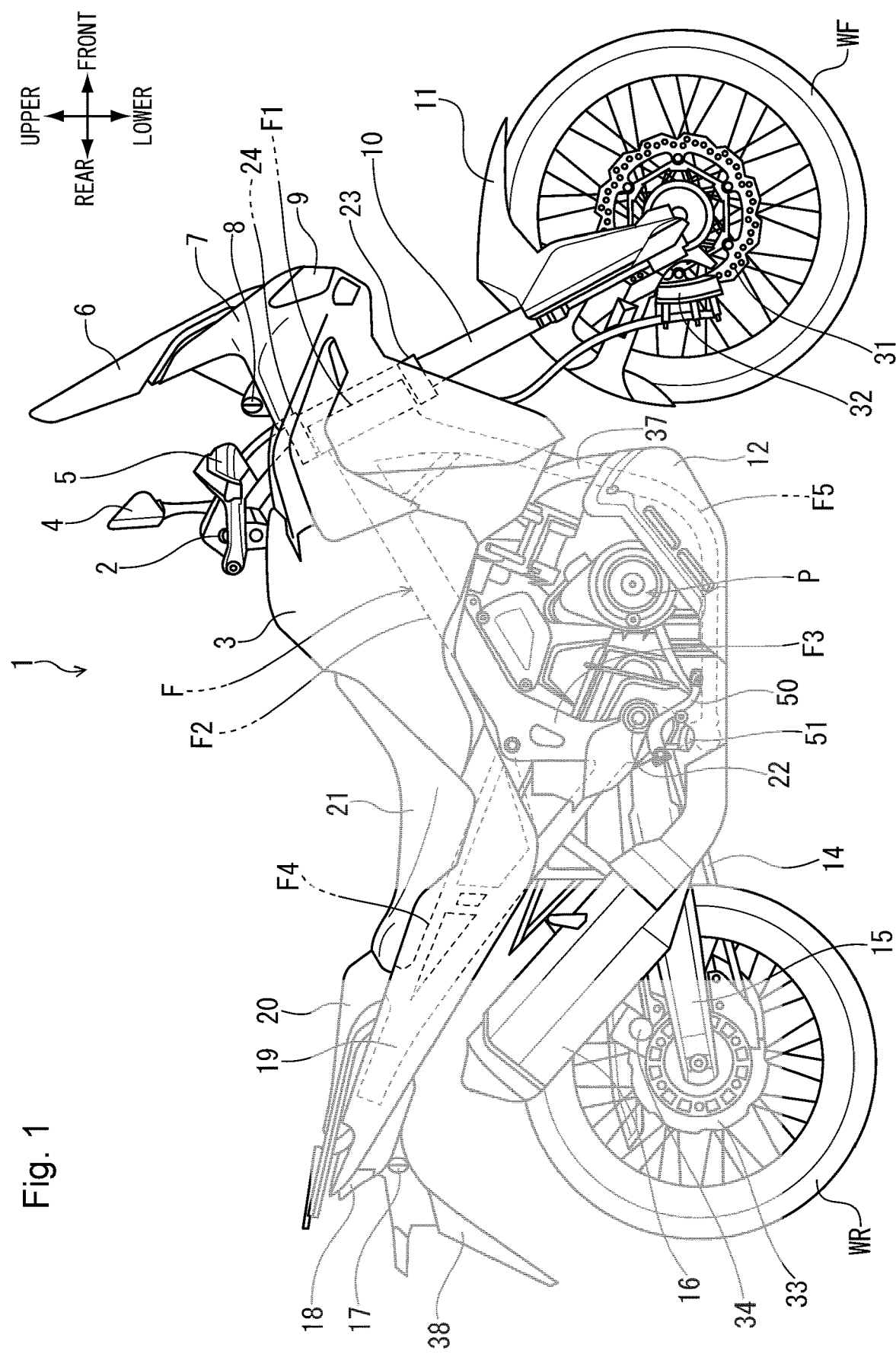
FIG. 1 is a right side view of a motorcycle to which a brake pedal structure related to an embodiment of the present invention is applied.

Hereinafter, preferable embodiments of the present invention will be explained in detail referring to the drawings. FIG. 1 is a right side view of a motorcycle 1 to which a brake pedal structure related to an embodiment of the present invention is applied. The motorcycle 1 is a saddled vehicle that transmits a drive force of a power unit P to a rear wheel WR through a drive chain 14. A steering stem is pivotally supported by a head pipe F1 in a swingable manner, the head pipe F1 being positioned at the front end of a body frame F. A bottom bridge 23 and a top bridge 24 are fixed to an upper position and a lower position of the steering stem, the bottom bridge 23 and the top bridge 24 supporting a pair of left and right front forks 10.

A steering handlebar 2 is attached to the upper portion of the top bridge 24, and a pair of left and right knuckle guards 5 and back mirrors 4 are fixed to the steering handlebar 2. A front wheel brake caliper 32 and a front fender 11 are attached to the front forks 10, the front brake caliper 32 imparting a brake force to a front wheel brake disk 31 that rotates synchronously with a front wheel WF.

A pair of left and right main frames F2 and an under frame F5 are attached to the rear portion of the head pipe F1, the main frames F2 extending obliquely downward to the rear, the under frame F5 extending downward and supporting the lower side of the power unit P. A pivot frame F3 is connected to the rear end of the main frame F2, the pivot frame F3 including a pivot 22 that pivotally supports a swing arm 15 in a swingable manner, and the rear end of the under frame F5 is connected to the lower end of the pivot frame F3. A pair of left and right foot placing steps 51 are attached to the pivot frame F3 by a rider placing his/her feet on the foot placing steps 51.

A drive force of the power unit P is transmitted to the rear wheel WR through the drive chain 14, the power unit P being surrounded and supported by the main frames F2 and the under frame F5. An under guard 12 is attached to the bottom portion close to the front of the power unit P. Combustion gas of the power unit P is transferred to a muffler 16 through an exhaust pipe 37 that passes inside the under guard 12, the muffler 16 being located on the rear side of the vehicle body.

The rear wheel WR is pivotally supported by the rear end portion of the swing arm 15 in a rotatable manner, the swing arm 15 being pivotally supported by the pivot 22. A rear wheel caliper 34 is supported by the swing arm 15, the rear wheel caliper 34 imparting a brake force to a rear wheel brake disk 33 that rotates synchronously with the rear wheel WR. The brake pedal structure related to the present invention is applied to a brake pedal 50, the brake pedal 50 being pivotally supported by the pivot frame F3 on the right side in the vehicle width direction in a swingable manner and being operated by the right foot of the rider placed on the foot placing step 51.

A front cowl 7 is disposed on the front side of the vehicle body of the head pipe F1, the front cowl 7 supporting a head light 9, a windshield screen 6, and a pair of left and right front flasher lamps 8. A fuel tank 3 is disposed on the rear side of the vehicle body of the front cowl 7 and at the upper portion of the main frames F2. A rear frame F4 is fixed to the rear portion of the pivot frame F3, the rear frame F4 supporting a front seat 21 and a rear seat 20, the rider sitting on the front seat 21, a passenger sitting on the rear seat 20. The left and right in the vehicle width direction of the rear frame F4 are covered by a rear cowl 19, and a rear fender 38 is attached to the rear end of the rear cowl 19, the rear fender 38 supporting a tail lamp device 18 and a pair of left and right rear flasher lamps 17.

Figure 2:
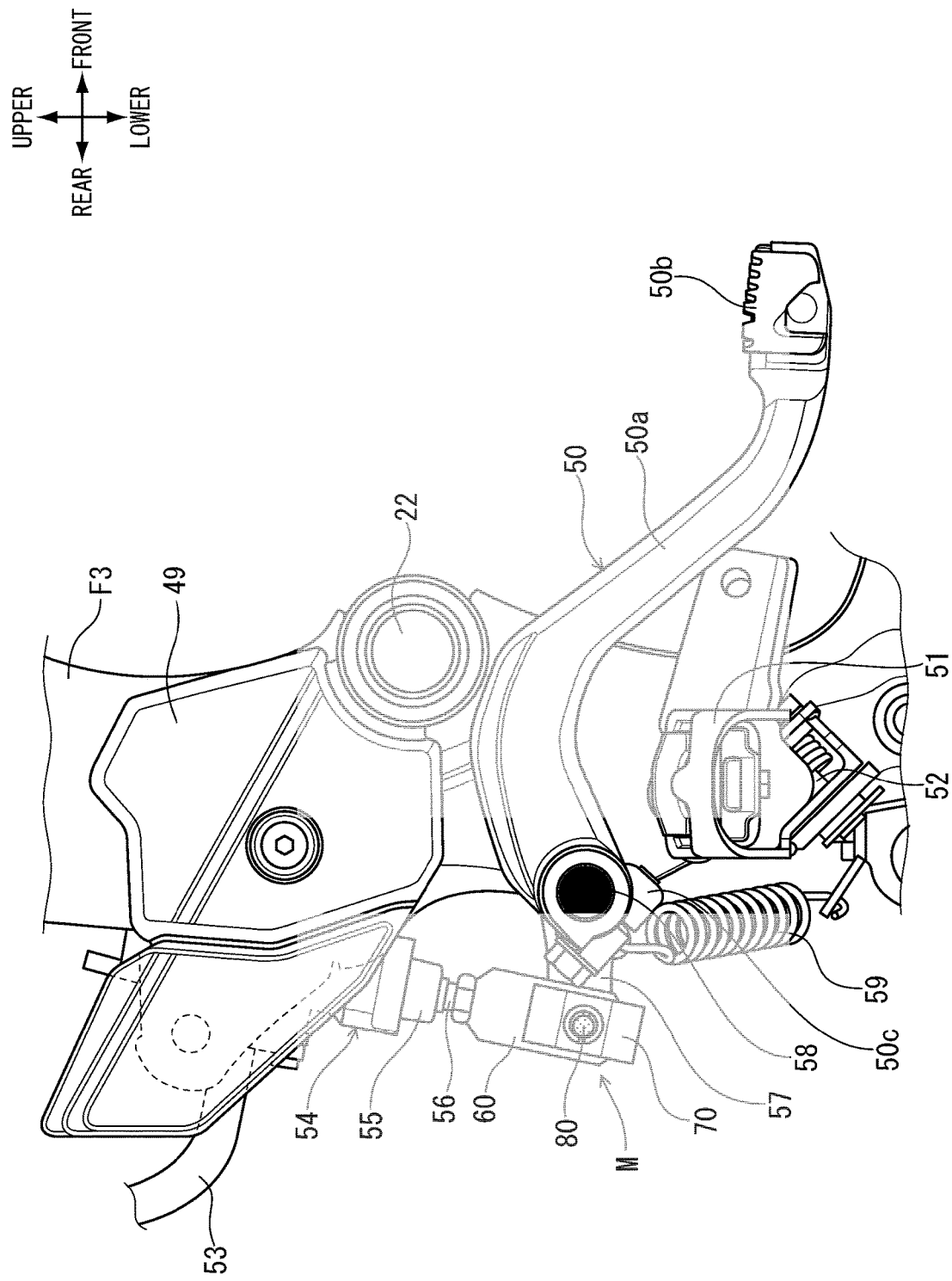
FIG. 2 is a partial enlarged view of FIG. 1 showing a configuration around the brake pedal.

FIG. 2 is a partial enlarged view of FIG. 1 showing a configuration around the brake pedal 50. The foot placing steps 51 for the rider is configured to be swingable upward to the rear of the vehicle body by a swing shaft 52 that inclines forward with respect to the vertical direction, and is biased to the initial position direction by a return spring. The brake pedal 50 formed of metal such as aluminum includes an arm portion 50a, a pedal stepping portion 50b, and a clamp portion 50c, the arm portion 50a curving downward to the front of the vehicle body, the pedal stepping portion 50b being arranged at the front end of the arm portion 50a, the clamp portion 50c being arranged at the rear end of the arm portion 50a. The brake pedal 50 is pivotally supported by a pivot frame F3 in a swingable manner by way of a swing shaft 58 that is supported by the clamp portion 50c, and is configured that a master cylinder 54 is activated by that the pedal stepping portion 50b is pressed downward, the master cylinder 54 supplying hydraulic pressure to the rear wheel brake caliper 34.

The master cylinder 54 is fixed to the rear end of the pivot frame F3, and the right side in the vehicle width direction of the master cylinder 54 is covered by a heel guard 49 that is attached to the pivot frame F3. A reservoir hose 53 is connected to the side portion of the master cylinder 54, the reservoir hose 53 supplying a brake liquid from a reservoir tank.

A rear arm 57 (the gray-colored portion in the drawing) is fixed to the swing shaft 58 that is supported by the clamp portion 50c. When the pedal stepping portion 50b is pressed down and the brake pedal 50 is made to swing clockwise in the drawing, a connection mechanism M connected to the rear arm 57 moves upward and pushes up an operation shaft 56 of the master cylinder 54. A cup member 55 made of rubber is attached to the outer circumferential portion of the operation shaft 56, the cup member 55 protecting the sliding portion of the master cylinder 54 from the moisture, dust, and the like.

The connection mechanism M includes a holder 60, a connection pin 80 (the dotted hatching portion in the drawing), and an operation member 70, the holder 60 supporting the operation shaft 56, the connection pin 80 connecting the rear arm 57 and the holder 60 to each other, the operation member 70 being for turning the connection pin 80. A return spring 59 engages with the rear arm 57 of the brake pedal 50, the return spring 59 imparting a biasing force that returns the brake pedal 50 to the initial position.

Figure 3:
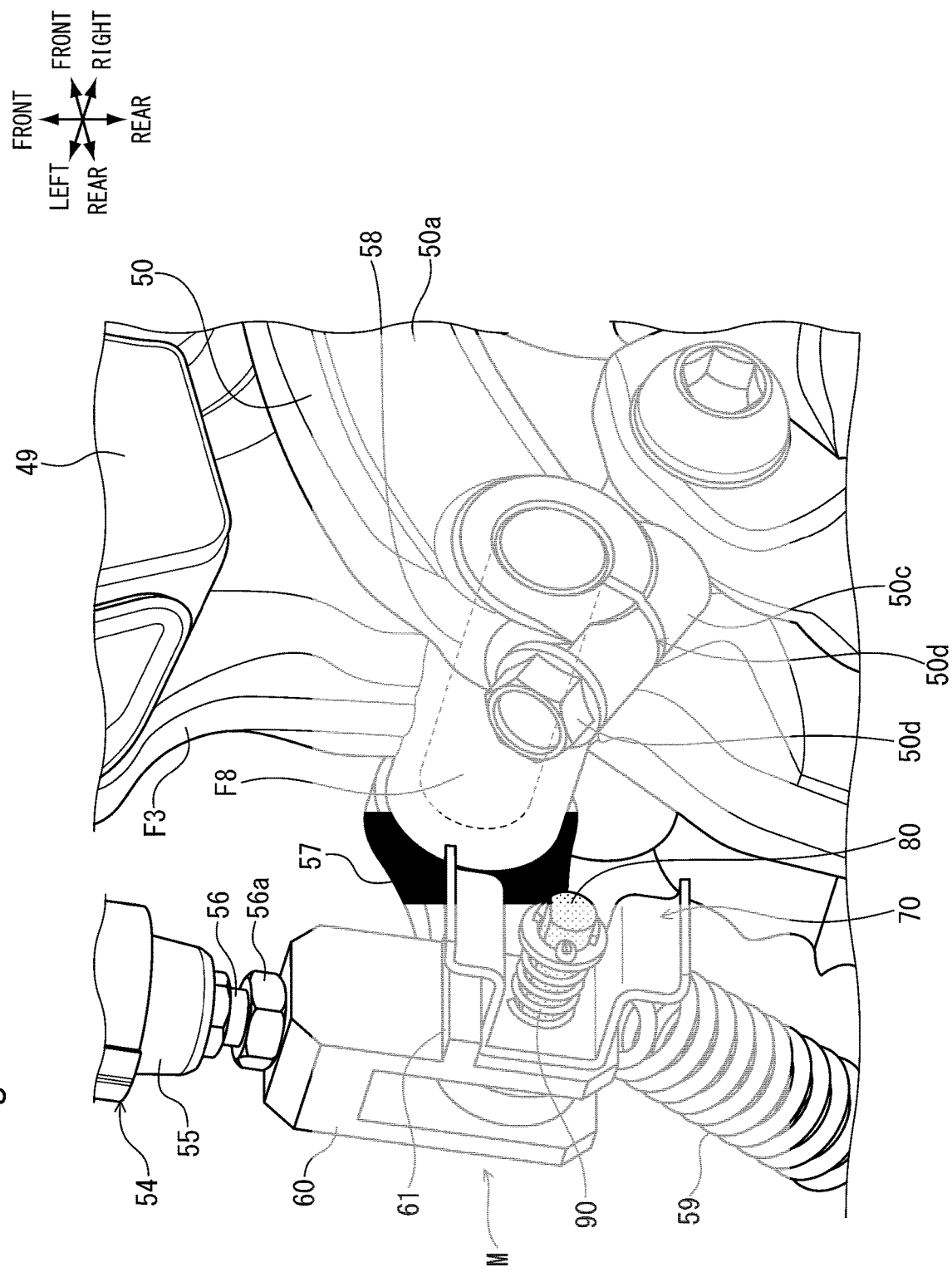
FIG. 3 is an enlarged perspective view showing the connection mechanism and its surrounding configuration.

FIG. 3 is an enlarged perspective view showing the connection mechanism M and its surrounding configuration. The swing shaft 58 is pivotally supported by a pipe member F8 that is fixed to the pivot frame F3, the swing shaft 58 being oriented to the vehicle width direction, and the rear arm 57 formed of a plate-like member is fixed to the end on the left side in the vehicle width direction of the swing shaft 58. A lock nut 56a is disposed at the upper portion of the holder 60, the lock nut 56a preventing rotation of the operation shaft 56 that is screwed to the holder 60.

The rear arm 57 and the connection pin 80 are stored in the groove portion that is arranged in the lower portion of the holder 60, and the end on the left side in the vehicle width direction of the connection pin 80 penetrates the holder 60 and protrudes to the right side in the vehicle width direction. A biasing member 90 and the operation member 70 are disposed between the end of the connection pin 80 and the holder 60, the biasing member 90 being formed of a coil spring, the operation member 70 being biased to the holder 60 side by the biasing member 90. A plate-like turning restriction portion 61 arranged on the side wall of the holder 60 has a function of forbidding turning operation of the operation member 70 when the operation member 70 is at a predetermined turning position.

Figure 4:
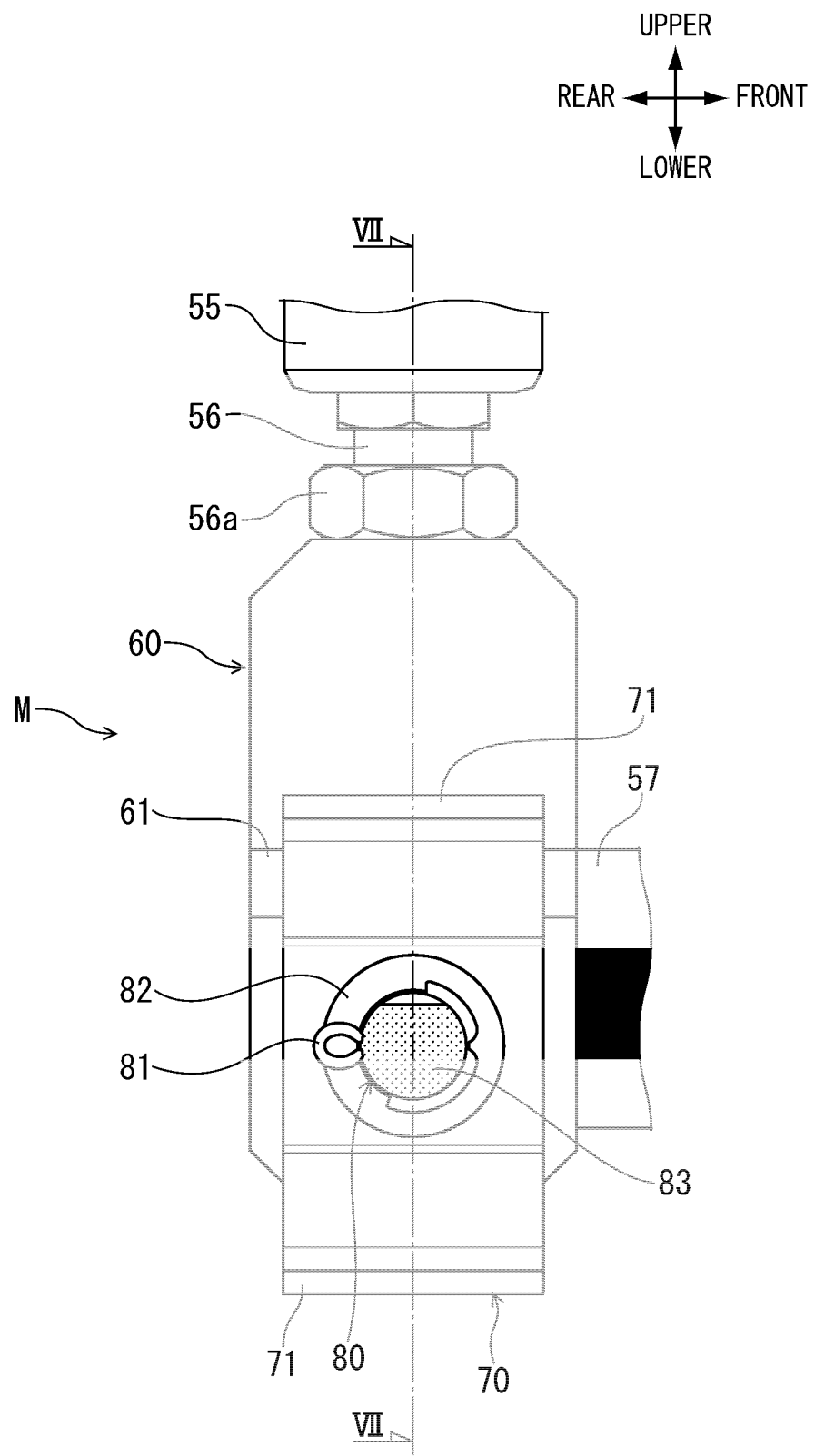
FIG. 4 is a right side view when the connection mechanism is viewed from the right side in the vehicle width direction.

FIG. 4 is a right side view when the connection mechanism M is viewed from the right side in the vehicle width direction. An extension portion 83 having a small diameter is formed at the end on the right side in the vehicle width direction of the connection pin 80. The extension portion 83 has a generally D-shaped cross section that is obtained by cutting a part of the circular shape by a flat surface. A washer 82 and a split pin 81 engage with the extension portion 83, the washer 82 holding the biasing member 90, the split pin 81 preventing the washer 82 from dropping off. A gripping portion 71 for turning operation of the operation member 70 is arranged at the end of the operation member 70, and the connection pin 80 turns synchronously by turning operation of the operation member 70.

Figure 5:
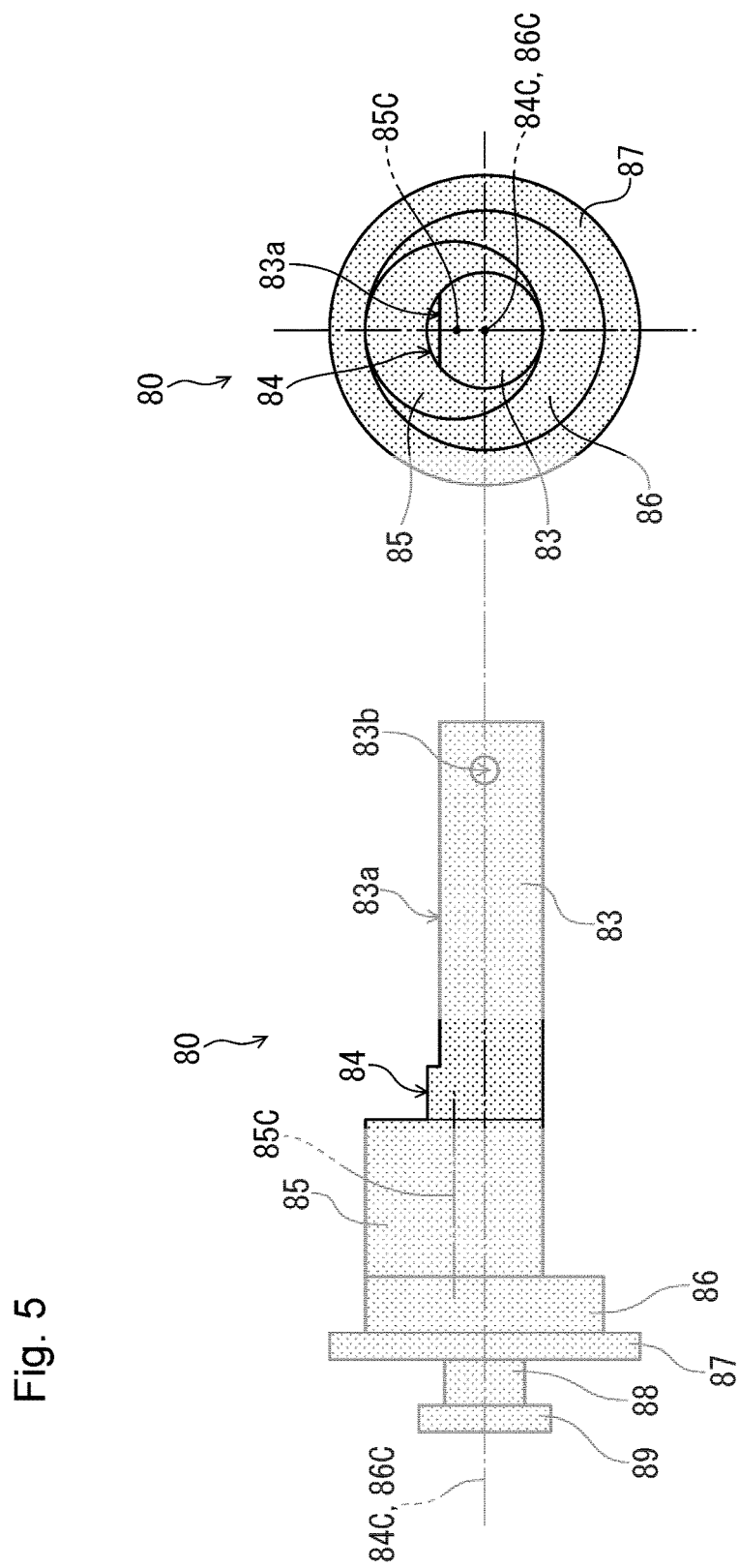
FIG. 5 is a single body drawing of the connection pin.

FIG. 5 is a single body drawing of the connection pin 80. The left side of the drawing is a rear view when the connection pin 80 is viewed from the rear side of the vehicle body in a state of being attached to the vehicle body, and the right side of the drawing is a right side view when the connection pin 80 is viewed from the right side in the vehicle width direction. As described above, the extension portion 83 engaging with the operation member 70 is arranged in the connection pin 80. A flat surface portion 83a is formed in the extension portion 83, the flat surface portion 83a being for cutting a part of a circular column to form the generally D-shaped cross section, the circular column being obtained by extending the end portion of a small diameter shaft 84, and a through hole 83b is arranged at a position close to the outer side in the vehicle width direction of the extension portion 83, the through hole 83b allowing the split pin 81 to pass through.

To the left in the vehicle width direction of the extension portion 83, the small diameter shaft 84 as a holder support shaft, an arm support shaft 85, and a large diameter shaft 86 as a holder support shaft are arranged, the small diameter shaft 84 being pivotally supported by the holder 60, the arm support shaft 85 supporting the rear arm 57, the large diameter shaft 86 being supported by the holder 60. According to the present embodiment, the extension portion 83, the small diameter shaft 84, and the large diameter shaft 86 are disposed coaxially in a coaxial manner to each other, whereas only the arm support shaft 85 is arranged eccentrically. In other words, an axis 86C of the large diameter shaft 86 and an axis 84C of the small diameter shaft 84 form a common rotation axis, and an axis 85C of the arm support shaft 85 is eccentric with respect to these axes 84C, 86C. Thus, the position of the arm support shaft 85 can be changed accompanying the turning operation of the connection pin 80. The diameter of the arm support shaft 85 is set to be larger than the diameter of the small diameter shaft 84 and smaller than the diameter of the large diameter shaft 86. According to the present embodiment, it is configured that the outer circumferential surface of the arm support shaft 85 matches with the outer circumferential surface of the small diameter shaft 84 and the outer circumferential surface of the large diameter shaft 86 at one position.

A stopper plate 87 having a circular shape abutting upon the side surface on the left side in the vehicle width direction of the holder 60 is arranged on the left side in the vehicle width direction of the large diameter shaft 86, and a hook 88 and a flange portion 89 as a connection portion are arranged on the left side in the vehicle width direction of the stopper plate 87, the hook 88 and the flange portion 89 having a circular cross section for pulling the brake switch. The stopper plate 87, the hook 88, and the flange portion 89 are also set to be coaxial with the large diameter shaft 86 and the small diameter shaft 84.

Figure 6:
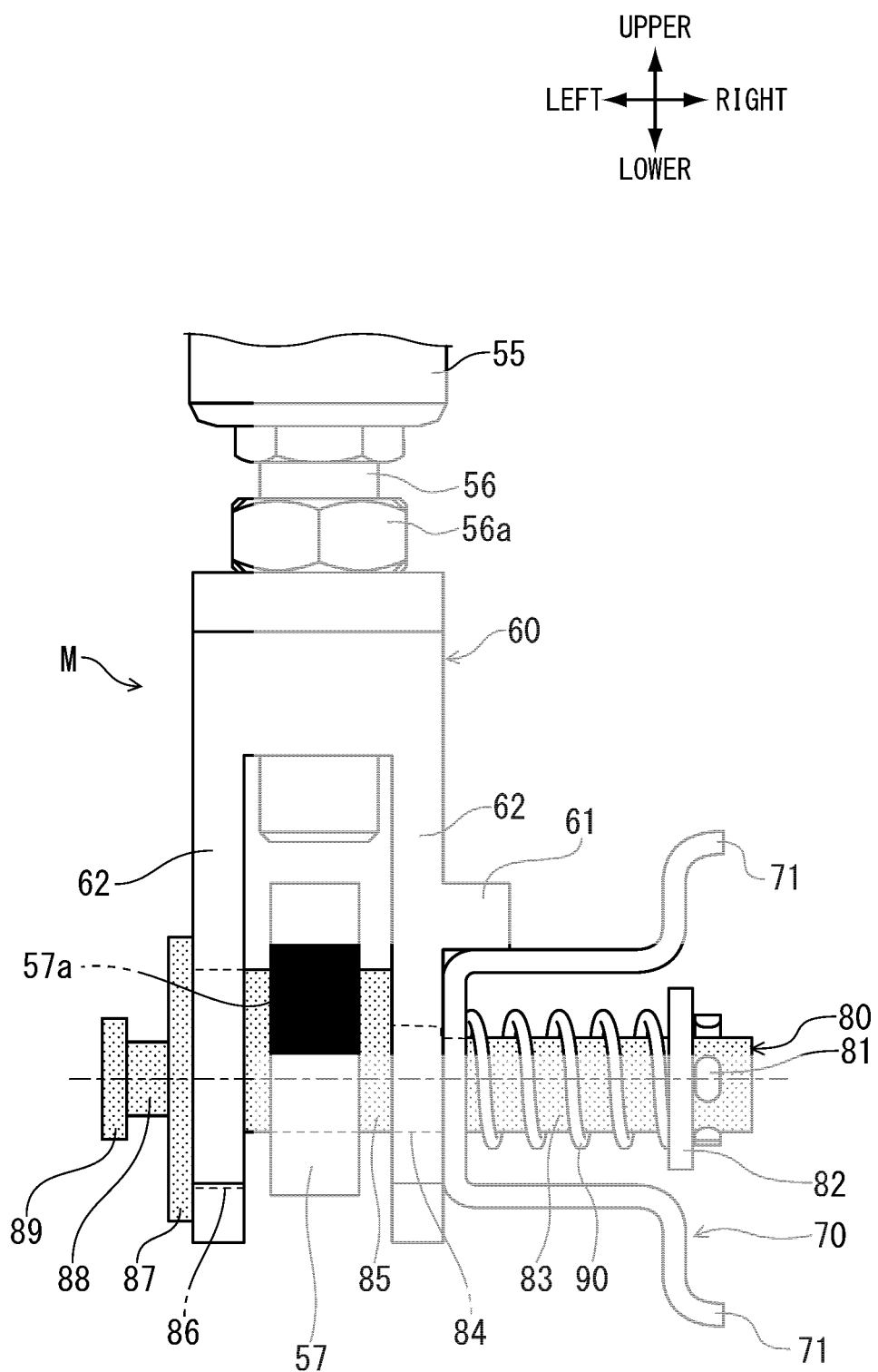
FIG. 6 is a rear view when the connection mechanism is viewed from the rear side of the vehicle body.
Figure 7:
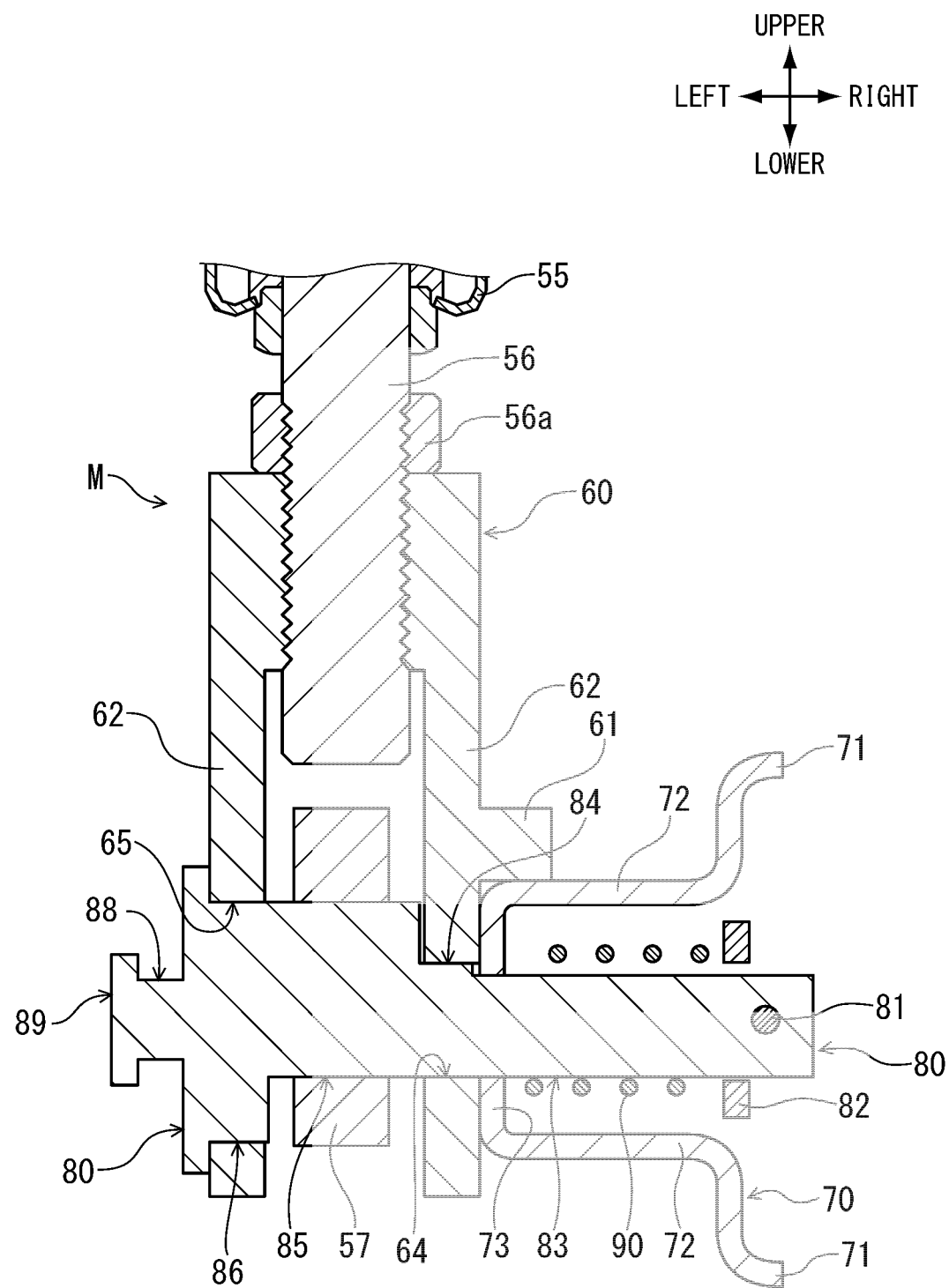
FIG. 7 is a cross-sectional view taken along the line VII-VII of FIG. 4.

FIG. 6 is a rear view when the connection mechanism M is viewed from the rear side of the vehicle body. Also, FIG. 7 is a cross-sectional view taken along the line VII-VII of FIG. 4. The connection pin 80 is pivotally supported by two side walls 62 in a turnable manner, the two side walls 62 being arranged in the holder 60 and opposing with each other. The rear arm 57 is stored in the groove portion in a state of being pivotally supported by the arm support shaft 85 of the connection pin 80 by way of a support opening 57a, the groove portion being formed by the left and right side walls 62. The large diameter shaft 86 of the connection pin 80 is pivotally supported by a large diameter opening 65 that is formed in the side wall 62 on the left side in the vehicle width direction, whereas the small diameter shaft 84 of the connection pin 80 is pivotally supported by a small diameter opening 64 that is formed in the side wall 62 on the right side in the vehicle width direction.

The operation member 70 is made slidable in the axial direction and non-turnable in the circumferential direction with respect to the extension portion 83 by that the extension portion 83 is inserted to an opening having a generally D-shaped cross section that matches the cross-sectional shape of the extension portion 83. Also, the operation member 70 is biased to the holder 60 side by the biasing member 90, and a position at which a bottom surface portion 73 abuts upon the side wall 62 of the holder 60 is made the predetermined position of the operation member 70.

The turning restriction portion 61 formed on the side wall 62 of the holder 60 holds the operation member 70 at the predetermined position by abutment upon the end surface of a side surface portion 72 or the bottom surface portion 73 of the operation member 70. On the other hand, when the operation member 70 is pulled to the right side in the vehicle width direction from a state of being held at the predetermined position, namely when the operation member 70 is made to slide outward in the axial direction resisting the biasing force of the biasing member 90, and the abutment state against the turning restriction portion 61 is released, the operation member 70 can be turned. When the connection pin 80 turns accompanying the turning operation of the operation member 70, the position of the arm support shaft 85 changes, and the initial angle of the brake pedal 50 changes.

Figure 8:
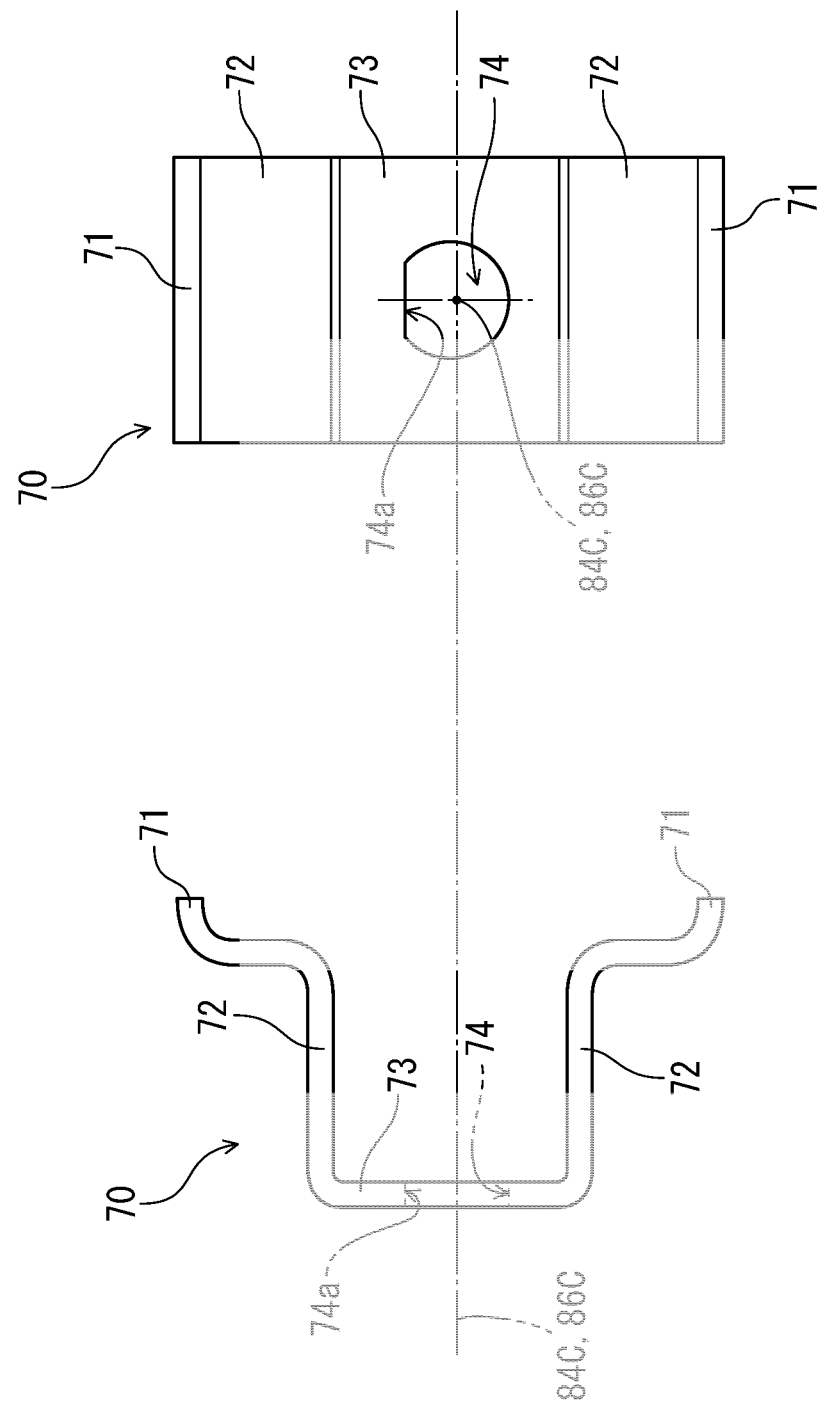
FIG. 8 is a single body drawing of the operation member.

FIG. 8 is a single body drawing of the operation member 70. The left side of the drawing is a rear view when the operation member 70 is viewed from the rear side of the vehicle body in a state of being attached to the vehicle body, and the right side of the drawing is a right side view when the operation member 70 is viewed from the right side in the vehicle width direction. In the drawing, there are shown the axis 86C of the large diameter shaft 86 and the axis 84C of the small diameter shaft 84 which form a common rotation axis of the connection pin 80. The operation member 70 formed by bending a plate-like member and the like includes the bottom surface portion 73, the side surface portion 72, and the gripping portion 71, the bottom surface portion 73 abutting upon the side wall 62 of the holder 60, the side surface portion 72 abutting upon the turning restriction portion 61, the gripping portion 71 being for turning operation of the operation member 70. In an opening 74 formed in the bottom surface portion 73, a flat surface portion 74a is formed, the flat surface portion 74a being for forming a generally D-shaped cross section that supports the extension portion 83 of the connection pin 80 so as to be slidable and non-turnable.

With respect to the operation member 70 related to the present embodiment, by formation of a metal plate using a pressing mold, production man-hour reduction and weight reduction can be effected. Further, although the opening of the bottom surface portion 73 is made to have a generally D-shaped cross section according to the present embodiment, various alterations are possible matching the cross-sectional shape of the extension portion 83, for example an elongated circular shape with a flat surface shape of upper and lower 2 surfaces, a quadrangular shape, and so on.

Figure 9:
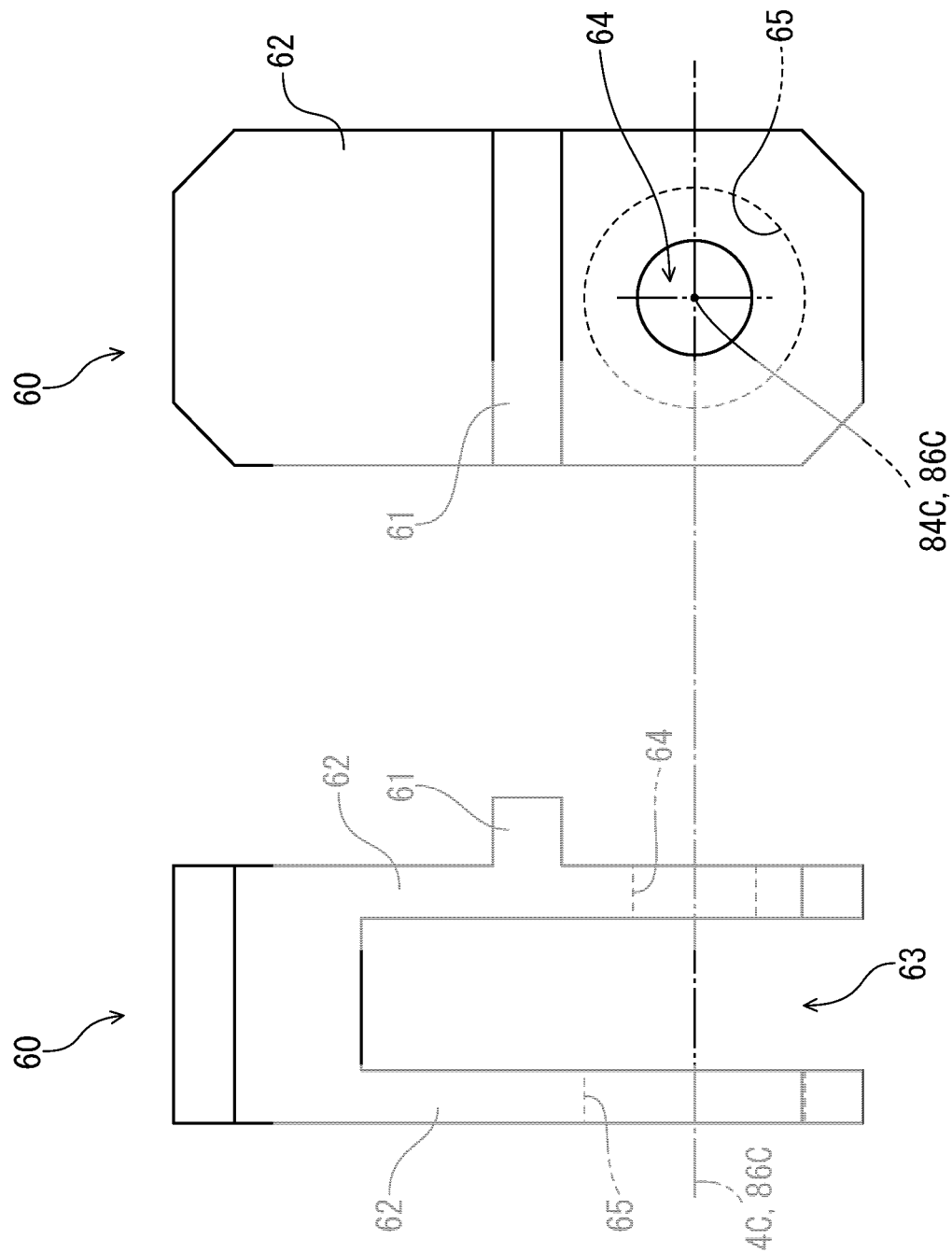
FIG. 9 is a single body drawing of the holder.

FIG. 9 is a single body drawing of the holder 60. The left side of the drawing is a rear view when the holder 60 is viewed from the rear side of the vehicle body in a state of being attached to the vehicle body, and the right side of the drawing is a right side view when the holder 60 is viewed from the right side in the vehicle width direction. In the drawing, there are shown the axis 86C of the large diameter shaft 86 and the axis 84C of the small diameter shaft 84 which form a common rotation axis of the connection pin 80. In the two side walls 62 of the holder 60, the two side walls 62 opposing with each other, the large diameter opening 65 and the small diameter opening 64 are formed respectively so as to be coaxial, the large diameter shaft 86 of the connection pin 80 being pivotally supported by the large diameter opening 65, the small diameter shaft 84 of the connection pin 80 being pivotally supported by the small diameter opening 64. At this time, by forming the large diameter opening 65 on the left side in the vehicle width direction and forming the small diameter opening 64 on the right side in the vehicle width direction, the connection pin 80 can be inserted from the left side in the vehicle width direction for assembling, the turning restriction portion 61 can be disposed at a position on the lower side, and the operation member 70 can be made compact. With respect to the holder 60 related to the present embodiment, although two side walls 62 opposing with each other are configured by arranging a deep groove in a casted or extruded component of a metal and production man-hour is reduced, it is also possible to form the entire holder by machining. Also, the turning restriction portion 61 is not limited to a plate-like member erected on the side wall 62, and a protrusion, a step-shape, and the like are also possible as far as a step is configured which restricts turning of the operation member 70.

Hereinafter, the relation between the turning position of the connection pin 80 and the position of the brake pedal 50 will be explained using FIG. 10 to FIG. 13. In each drawing, a cross-sectional view (line A-A cross-sectional view, line B-B cross-sectional view, line C-C cross-sectional view, line D-D cross-sectional view) of the connection mechanism M is added.

Figure 10:
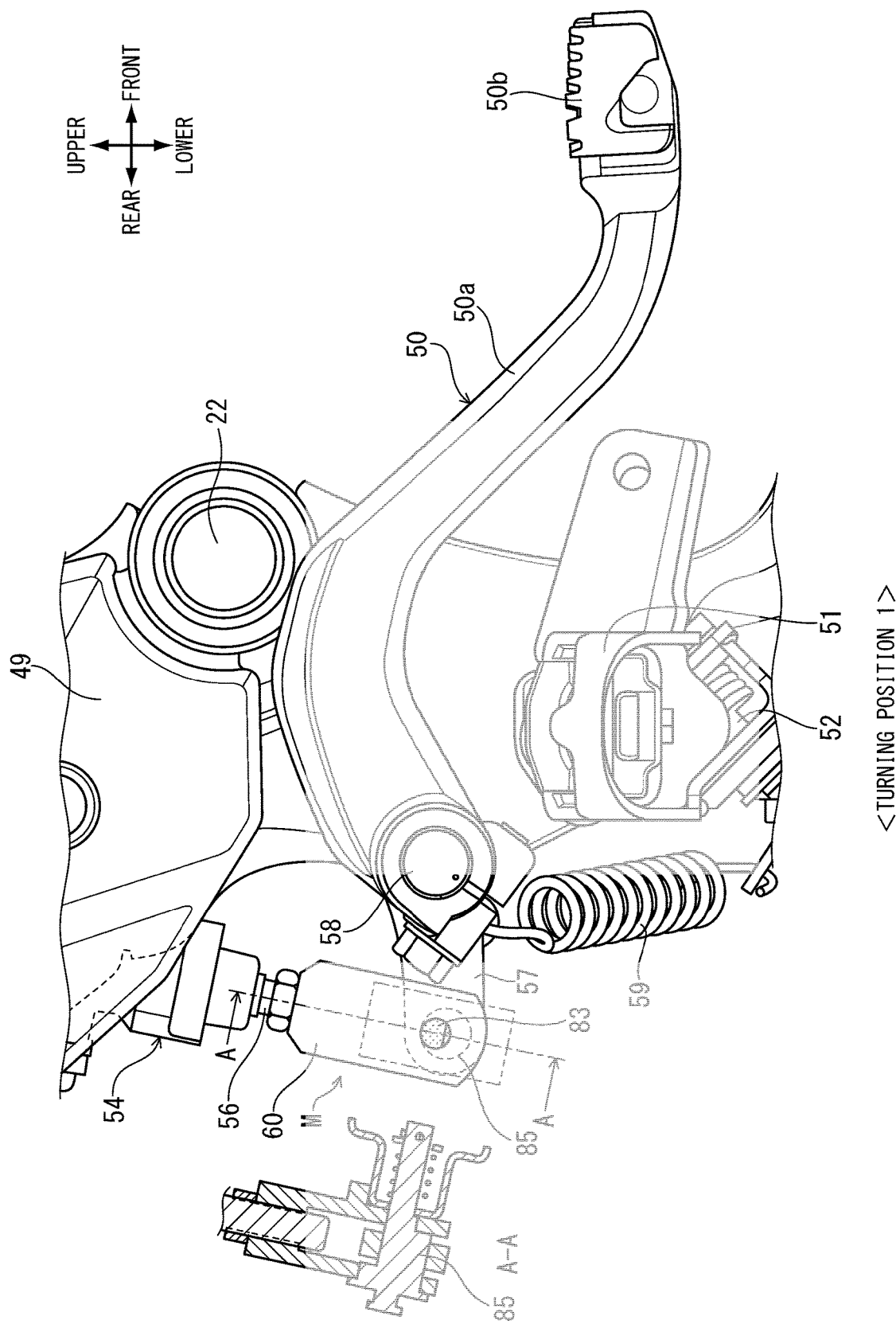
FIG. 10 is an explanatory drawing which shows the relation between the turning position of the connection pin and the position of the brake pedal (TURNING POSITION 1).

FIG. 10 is a positional relation drawing of a case the connection pin 80 is at the turning position 1. At the turning position 1, the pedal stepping portion 50b of the brake pedal 50 is at the highest position within the adjusting range. At this time, the arm support shaft 85 supporting the rear arm 57 is positioned closely to the lower side of the connection mechanism M. The pedal position achieved by this turning position 1 is suitable to off-road traveling and so on in the standing attitude with the lumbar being raised from the front seat 21.

Figure 11:
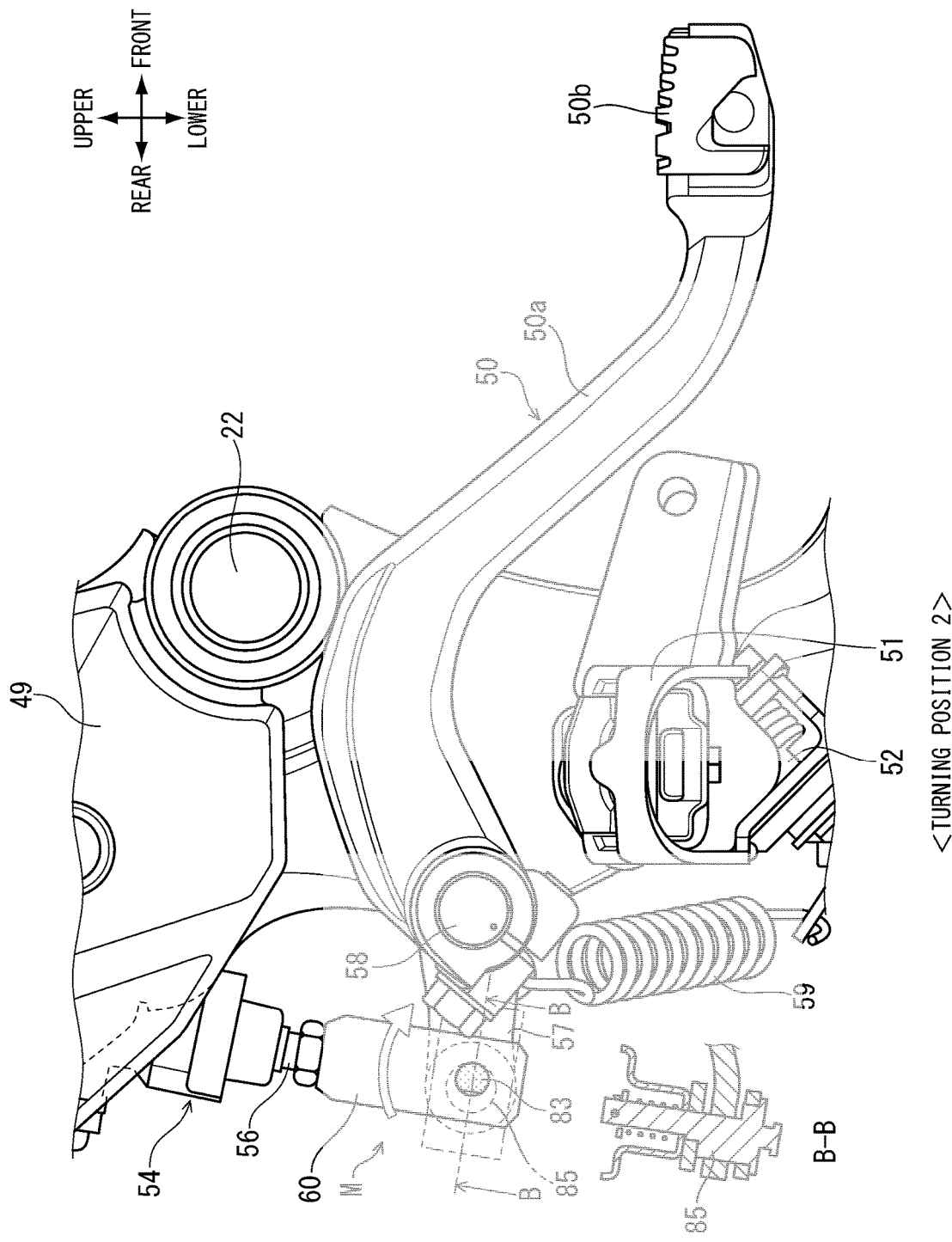
FIG. 11 is an explanatory drawing which shows the relation between the turning position of the connection pin and the position of the brake pedal (TURNING POSITION 2).

FIG. 11 is a positional relation drawing of a case the connection pin 80 is at the turning position 2. The turning position 2 shows a state the operation member 70 is turned clockwise by 90 degrees from the turning position 1. At this time, the arm support shaft 85 supporting the rear arm 57 is positioned closely to the rear side of the connection mechanism M, and the position of the pedal stepping portion 50b is slightly lowered compared to the case of the turning position 1.

Figure 12:
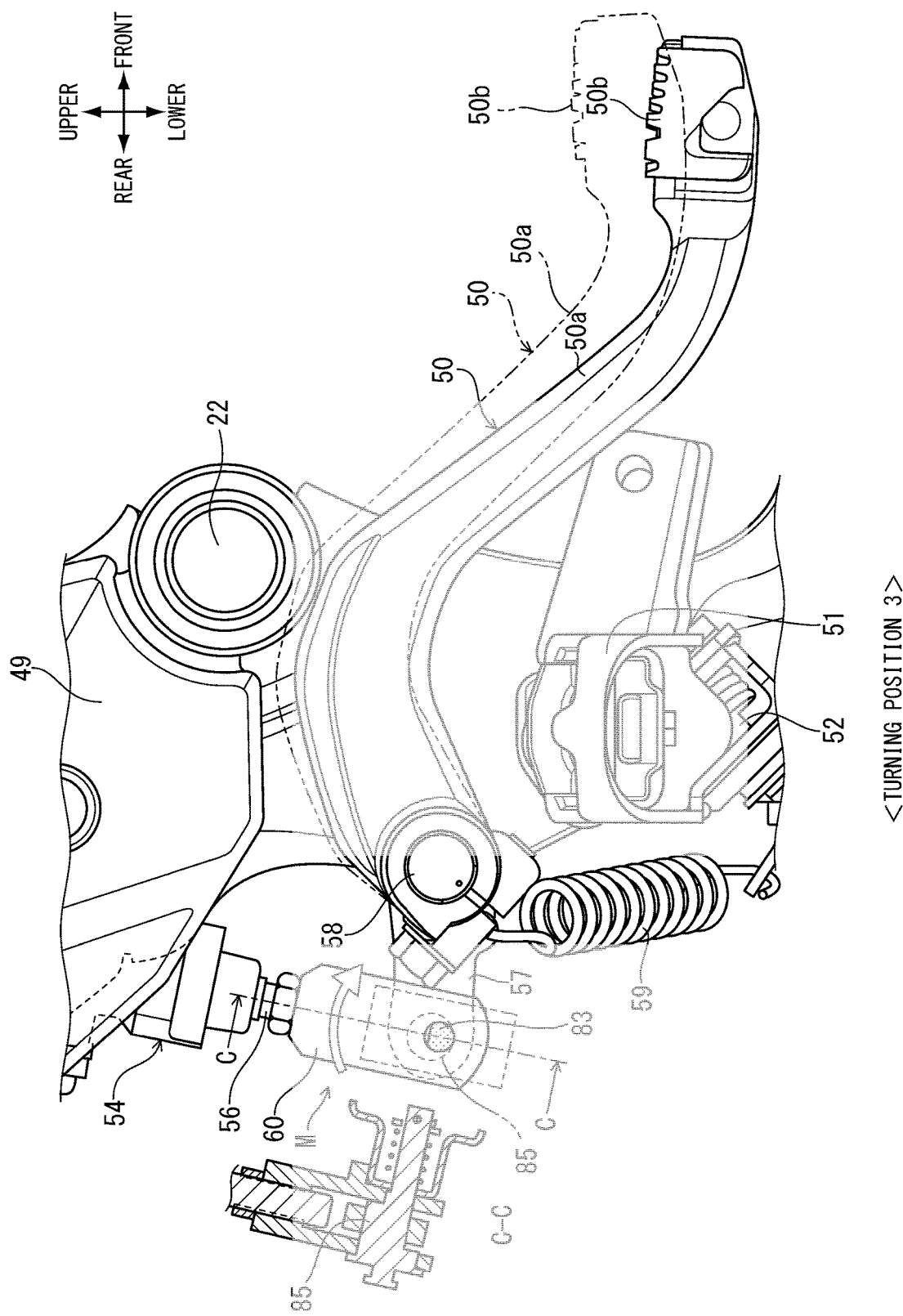
FIG. 12 is an explanatory drawing which shows the relation between the turning position of the connection pin and the position of the brake pedal (TURNING POSITION 3).

FIG. 12 is a positional relation drawing of a case the connection pin 80 is at the turning position 3. The turning position 3 shows a state the operation member 70 is turned clockwise by 90 degrees from the turning position 2. At this time, the arm support shaft 85 supporting the rear arm 57 is positioned closely to the lower side of the connection mechanism M, and the pedal stepping portion 50b is at the lowest position within the adjusting range. The pedal position achieved by this turning position 3 is suitable to on-road traveling and so on in the sitting attitude of sitting on the front seat 21.

Figure 13:
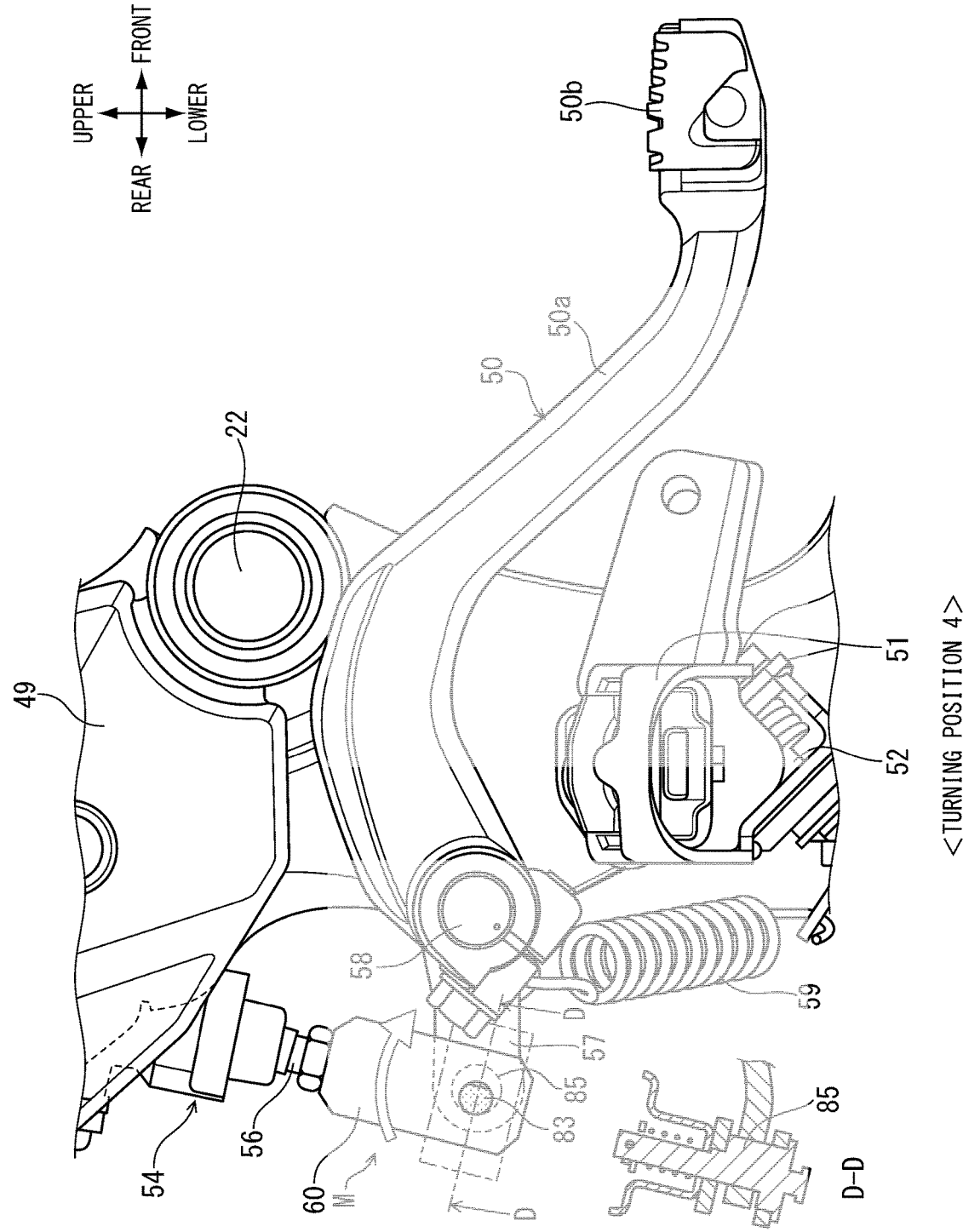
FIG. 13 is an explanatory drawing which shows the relation between the turning position of the connection pin and the position of the brake pedal (TURNING POSITION 4).

FIG. 13 is a positional relation drawing of a case the connection pin 80 is at the turning position 4. The turning position 4 shows a state the operation member 70 is turned clockwise by 90 degrees from the turning position 1. At this time, the arm support shaft 85 supporting the rear arm 57 is positioned closely to the rear side of the connection mechanism M, and the position of the pedal stepping portion 50b is slightly raised compared to the case of the turning position 3.

Here, the turning positions 2, 4 are common in terms that the height of the pedal stepping portion 50b is between that of the turning position 1 and that of the turning position 3, but are different in terms that a high brake force is easily secured because the lever ratio increases at the turning position 2 where the extension portion 83 comes closer to the swing shaft 58, whereas controllability of the brake force is improved because the lever ration reduces at the turning position 4 where the extension portion 83 becomes farther from the swing shaft 58. Thus, not only the height of the pedal stepping portion 50b but also the operation feeling of the rear wheel brake can be changed.

As described above, according to the brake pedal structure related to the present invention, the connection mechanism M includes the holder 60, the rear arm 57, and the connection pin 80, the holder 60 pressing the master cylinder 54, the rear arm 57 being fixed to the brake pedal 50, the connection pin 80 pivotally supporting the holder 60 and the rear arm 57 so as to be swingable against each other, the connection pin 80 includes the small diameter shaft 84, the large diameter shaft 86, and the arm support shaft 85, the small diameter shaft 84 and the large diameter shaft 86 being pivotally supported by the holder 60 and having a circular cross section, the arm support shaft 85 being pivotally supported by the rear arm 57 and having a circular cross section, the arm support shaft 85 is eccentric with respect to the small diameter shaft 84 and the large diameter shaft 86, therefore the initial angle of the brake pedal can be changed by turning the connection pin 80, and such brake pedal 50 can be obtained that the height of the pedal stepping portion 50b is adjustable while suppressing increase of the weight of the brake pedal side.

Also, the operation member 70 is engaged with the connection pin 80, the operation member 70 being slidable in the axial direction and non-turnable in the circumferential direction, the turning restriction portion 61 is arranged in the holder 60, the turning restriction portion 61 restricting turning of the operation member 70, the operation member 70 is biased toward the turning restriction portion 61 by the biasing member 90, and therefore such configuration is achieved that the connection pin 80 can be turned by gripping the operation member 70 without using a tool and the like and that the connection pin 80 does not turn unless the operation member 70 is operated intentionally.

Figure 14:
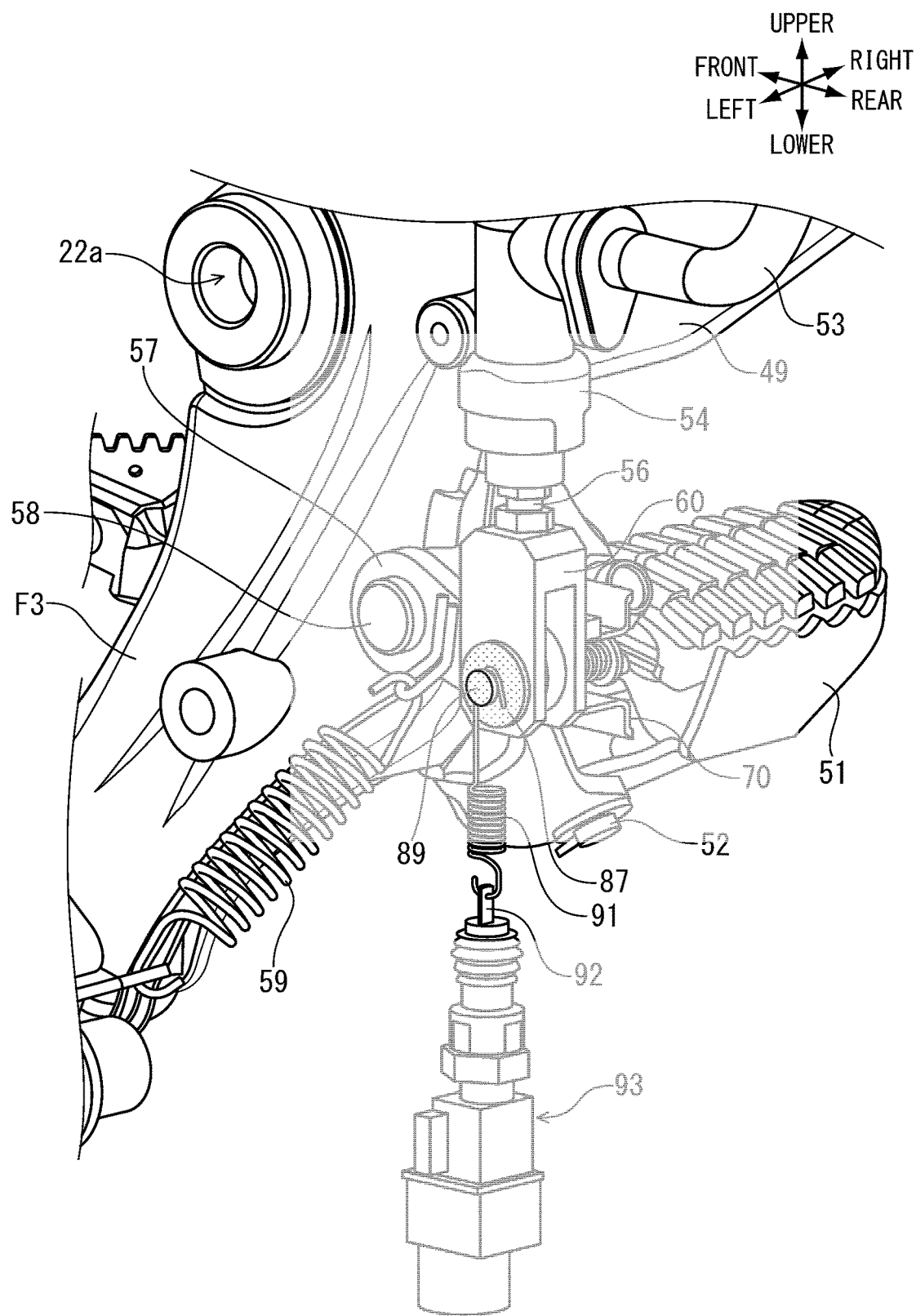
FIG. 14 is a perspective view when the connection mechanism is viewed from the inner side in the vehicle width direction.

FIG. 14 is a perspective view when the connection mechanism M is viewed from the inner side in the vehicle width direction. In the motorcycle 1, although it is required to arrange a brake switch that is for lighting the tail lamp device 18 accompanying the brake operation, in a mechanical type brake switch activated by pulling an operation element, when the operation element is engaged with the brake pedal 50 related to the present embodiment as it is, it is required to adjust the activation point of the brake switch every time the height of the brake pedal 50 is changed.

Therefore, in the present embodiment, it is configured that a brake switch 93 is disposed below the connection mechanism M, and that a spring hook 91 continuing to an operation element 92 of the brake switch 93 is engaged with the hook 88 that is arranged inside a flange portion 98 of the connection pin 80. According to this configuration, because the hook 88 is made to be coaxial with the turning center of the connection pin 80, the activation point of the brake switch 93 does not change even when the connection pin 80 is turned, and user-friendliness can be improved.

Figure 15:
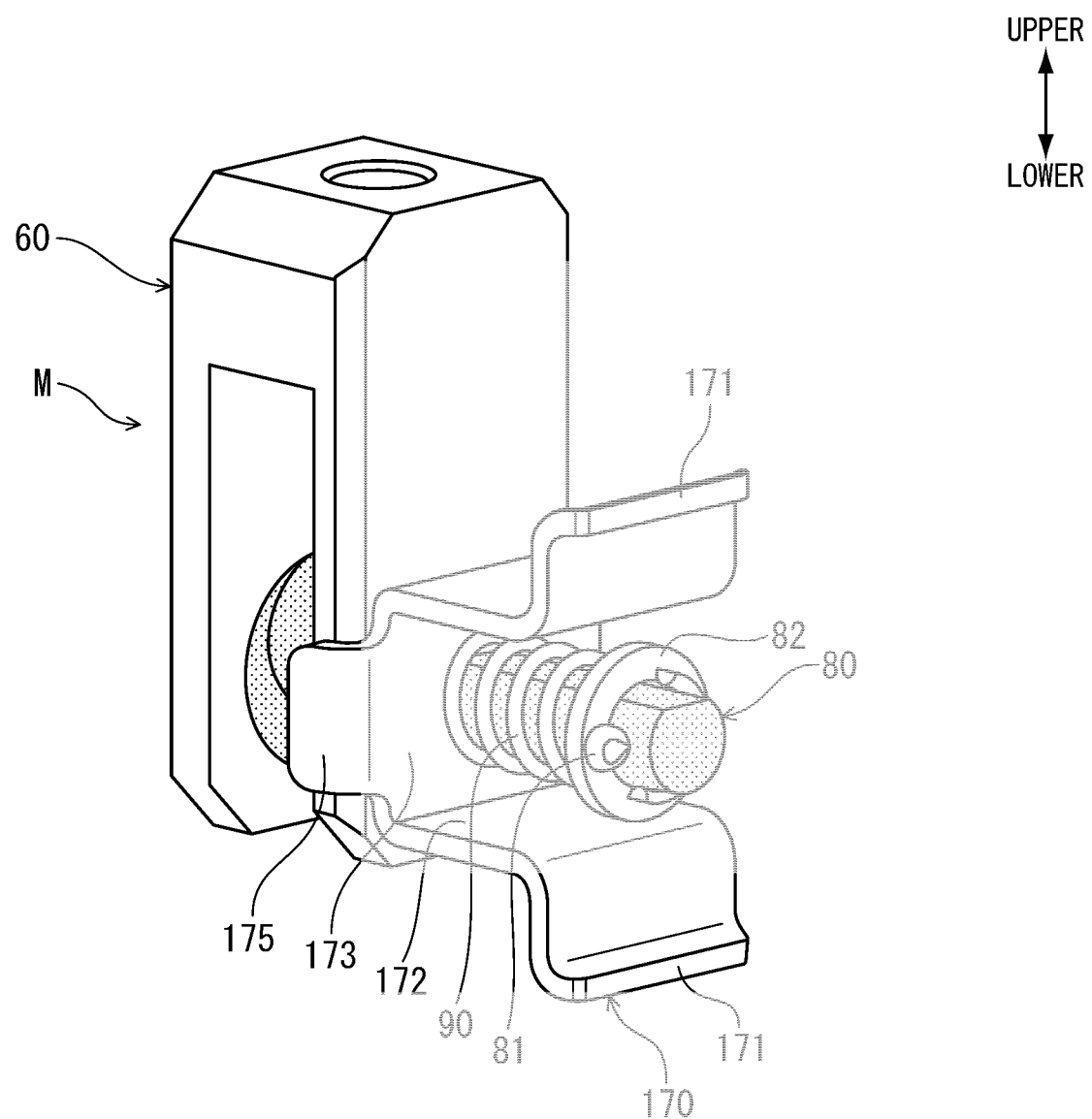
FIG. 15 is a perspective view of the connection mechanism related to a modification of the present embodiment.

FIG. 15 is a perspective view of the connection mechanism M related to a modification of the present embodiment. Although the turning restriction portion 61 was arranged in the holder 60 in the embodiment described above, this modification is characterized that turning restriction plates 175 are arranged in an operation member 170. Similarly to the operation member 70 shown in FIG. 8, the operation member 170 includes a bottom surface portion 173, side surface portions 172, and gripping portions 171, the side surface portions 172 being erected on both sides of the bottom surface portion 173, the gripping portions 171 being arranged at the end of the side surface portions 172. However, in this modification, by arranging the turning restriction plates 175 at both ends of the bottom surface portion 173, the turning restriction plates 175 engaging with the end surfaces of the holder 60, the turning position where the bottom surface portion 173 contacts the holder 60 is limited to two positions. Thus, for example, it is possible to be configured that the turning position of the operation ember 170 is limited to two positions and only the height of the pedal stepping portion 50b is changed. Also, in addition to a configuration that only the pedal ratio can be changed by turning the direction of the opening of the D-shaped cross section formed in the operation member 170 by 90 degrees or 270 degrees (90 degrees clockwise or 90 degrees counterclockwise), it is also possible that the pair of left and right turning restriction plates 175 that was arranged in the modification described above is made one piece only, the operation member 170 is configured not to be held at a position where the turning restriction plate 175 is directed upward, and the turning position of the operation member 170 is limited to three positions.

FIG. 16 is a perspective view of the connection mechanism M related to the second modification of the present embodiment. With respect to the shape of the operation member and the structure for restricting turning operation of the operation member, various modifications are possible. An operation member 270 related to the present modification is a component having a dial shape formed by machining of aluminum, and so on, and feeling in gripping the operation member 270 and appearance can be improved.

Figures 17A, 17B:
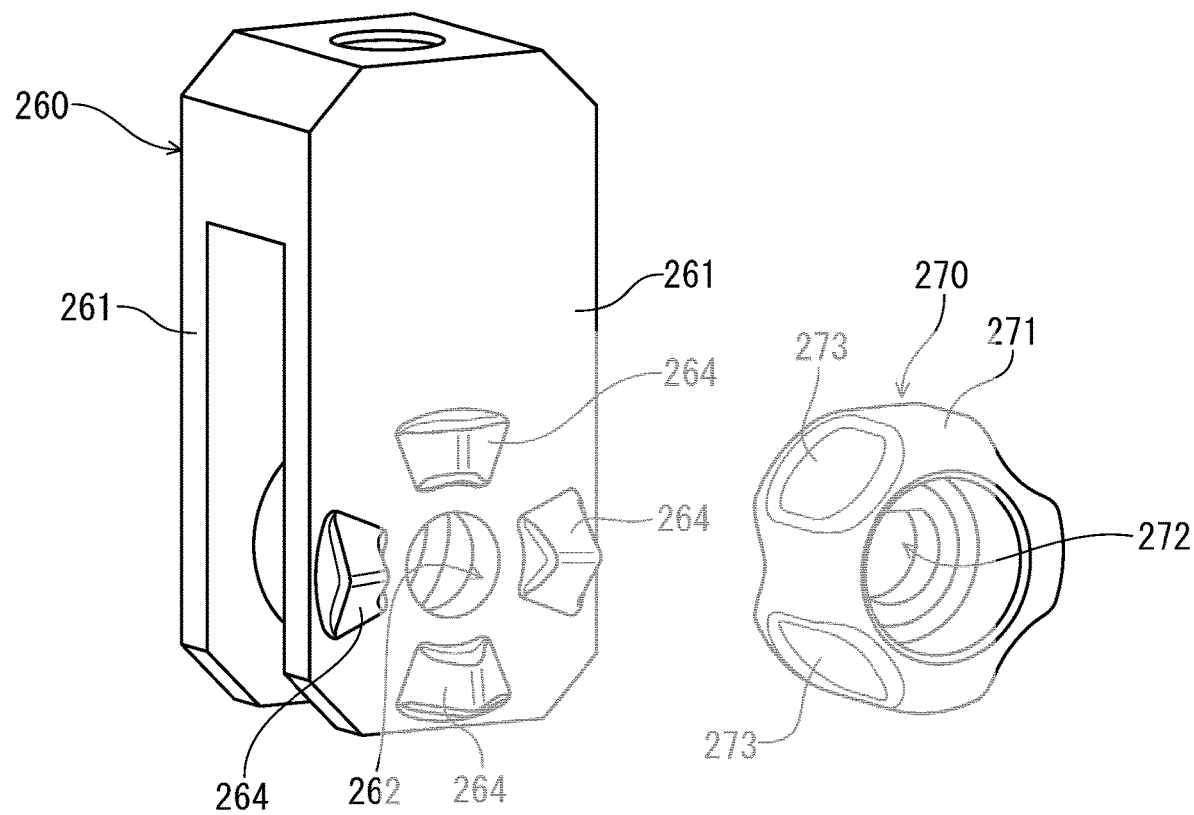
FIG. 17A is a perspective view showing a state the operation member related to the second modification of the present embodiment is made to depart from the holder.
FIG. 17B is a perspective view showing a state the operation member related to the second modification of the present embodiment is made to depart from the holder.
Figure 18:
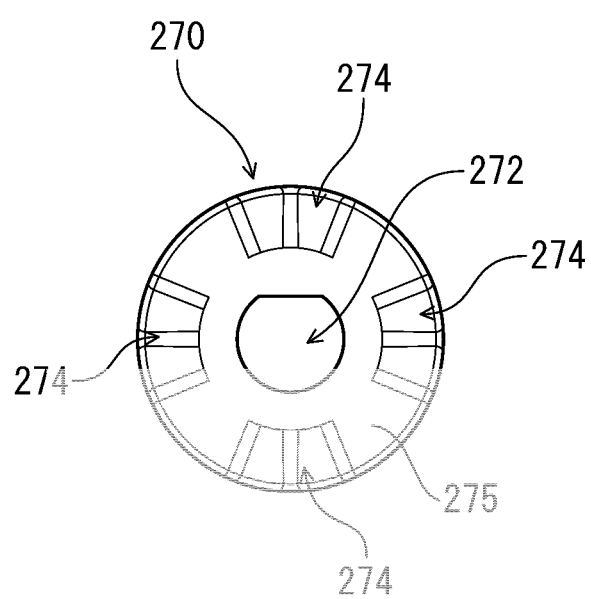
FIG. 18 is a rear view of the operation member related to the second modification of the present embodiment.

FIG. 17A and FIG. 17B are perspective view showings a state the operation member 270 related to the second modification of the present embodiment is made to depart from the holder 260. Also, FIG. 18 is a rear view of the operation member 270. At the center of the operation member 270, an opening 272 having a generally D-shape is formed, the extension portion 83 of the connection pin 80 penetrating the opening 272. In the outer circumferential surface of the operation member 270, recesses 273 matching the shape of the fingers are formed, and feeling and texture in turning operation are improved. On the other hand, on a side wall 261 of a holder 260, four turning restriction portions 264 protruding in a wedge shape are arranged at equal intervals at positions on a concentric circle around a small diameter opening 262 with which the small diameter shaft 84 of the connection pin 80 engages.

Referring to FIG. 18, in a rear surface 275 of the operation member 270, four engagement recesses 274 matching the shape of the turning restriction portions 264 are formed. According to the present embodiment, it is possible to keep the engaged state of the turning restriction portions 264 and the engagement recesses 274 by a biasing force of the biasing member 90, and to turn the operation member 270 while releasing the engaged state of the engagement recesses 274 and the turning restriction portions 264 without intentionally pulling the operation member 270 by strongly turning the operation member 270. Also, the shape of the turning restriction portion and the recess can be modified variously. For example, it may be configured to execute pulling operation and turning operation independently by shaping the turning restriction portion into a rectangular shape.

Also, the form of the motorcycle, the shape and attaching position of the brake pedal, the structure and attaching position of the master cylinder, the configuration of the connection mechanism, the shape of the rear arm and the holder, the shape and structure of the connection pin, the shape and structure of the operation member and the turning restriction portion, and so on are not limited to the embodiment described above, and various alterations are possible. The brake pedal structure related to the present invention can be applied to a three-wheeled vehicle, a four-wheeled vehicle, and the like of the saddle riding type.

REFERENCE SIGNS LIST

1 . . . saddled vehicle (motorcycle), 34 . . . brake caliper, 50 . . . brake pedal, 54 . . . master cylinder, 57 . . . arm, 60 . . . holder, 61 . . . turning restriction portion, 62 . . . side wall, 64 . . . small diameter opening, 65 . . . large diameter opening, 70 . . . operation member, 72 . . . side surface portion, 73 . . . bottom surface portion, 74 . . . opening, 80 . . . connection pin, 83 . . . extension portion, 84 . . . small diameter shaft (holder support shaft), 86 . . . large diameter shaft (holder support shaft), 85 . . . arm support shaft, 88 . . . hook (connecting part), 90 . . . biasing member, 92 . . . operation element, 93 . . . brake switch, M . . . connection mechanism, 260 . . . holder, 261 . . . side wall, 264 . . . turning restriction portion, 270 . . . operation member, 272 . . . opening, 274 . . . engagement recess, 275 . . . bottom surface portion

The invention claimed is:

1. A brake pedal structure for a saddled vehicle, comprising:
a master cylinder supplying hydraulic pressure to a brake caliper of the saddled vehicle; and
a brake pedal connected to the master cylinder through a connection mechanism,
wherein the connection mechanism includes a holder, an arm, and a connection pin, the holder pressing the master cylinder, the arm being fixed to the brake pedal, and the connection pin pivotally supporting the holder and the arm so as to be swingable against each other,
wherein the connection pin includes holder support shafts and an arm support shaft, the holder support shafts being pivotally supported by the holder and having a circular cross section, the arm support shaft being pivotally supported by the arm and having a circular cross section, and
wherein the arm support shaft is eccentric with respect to the holder support shafts.

2. The brake pedal structure for a saddled vehicle according to claim 1,
wherein the connection pin is engaged with an operation member that is slidable in an axial direction and non-turnable in a circumferential direction,
wherein the holder is provided with a turning restriction portion restricting turning of the operation member, and
wherein the operation member is biased toward the holder by a biasing member.

3. The brake pedal structure for a saddled vehicle according to claim 2,
wherein the connection pin has an end formed with an extension portion having a generally D-shape cross section, and
wherein the operation member is formed with an opening having a generally D-shape matching the cross-sectional shape of the extension portion.

4. The brake pedal structure for a saddled vehicle according to claim 2,
wherein the holder support shafts are configured with a large diameter shaft and a small diameter shaft having a same turning axis,
wherein a large diameter opening and a small diameter opening are formed in the holder in each of two side walls opposing with each other, the large diameter shaft being inserted into the large diameter opening, the small diameter shaft being inserted into the small diameter opening, and
wherein the arm support shaft is disposed between the large diameter shaft and the small diameter shaft, and is disposed within a range of a contour of the large diameter shaft in an axial view.

5. The brake pedal structure for a saddled vehicle according to claim 2, wherein the operation member is disposed on an outer side in a vehicle width direction of the holder.

6. The brake pedal structure for a saddled vehicle according to claim 4, wherein a hook for connecting an operation element of a brake switch is arranged at an axis position on a surface on an inner side in the vehicle width direction of the large diameter shaft.

7. The brake pedal structure for a saddled vehicle according to claim 2,
wherein the turning restriction portion has a shape of arranging a step on a side wall of the holder,
wherein the operation member is configured to arrange a bottom surface portion and a side surface portion by bending a plate-like member, the bottom surface portion abutting upon the side wall, the side surface portion abutting upon the turning restriction portion, and
wherein turning of the operation member is restricted by the side surface portion or an end surface of the bottom surface portion opposing the turning restriction portion.

8. The brake pedal structure for a saddled vehicle according to claim 2,
wherein the turning restriction portions are protrusions disposed on a side wall of the holder so as to form a concentric circle,
wherein engagement recesses are arranged in a bottom surface portion of the operation member, the engagement recesses matching a shape of the turning restriction portions, and
wherein turning of the operation member is restricted by engaging the turning restriction portions with the engagement recesses.

9. The brake pedal structure for a saddled vehicle according to claim 3,
wherein the holder support shafts are configured with a large diameter shaft and a small diameter shaft having a same turning axis,
wherein a large diameter opening and a small diameter opening are formed in the holder in each of two side walls opposing with each other, the large diameter shaft being inserted into the large diameter opening, the small diameter shaft being inserted into the small diameter opening, and
wherein the arm support shaft is disposed between the large diameter shaft and the small diameter shaft, and is disposed within a range of a contour of the large diameter shaft in an axial view.

10. The brake pedal structure for a saddled vehicle according to claim 3, wherein the operation member is disposed on an outer side in a vehicle width direction of the holder.

11. The brake pedal structure for a saddled vehicle according to claim 4, wherein the operation member is disposed on an outer side in a vehicle width direction of the holder.

12. The brake pedal structure for a saddled vehicle according to claim 3,
wherein the turning restriction portion has a shape of arranging a step on a side wall of the holder,
wherein the operation member is configured to arrange a bottom surface portion and a side surface portion by bending a plate-like member, the bottom surface portion abutting upon the side wall, the side surface portion abutting upon the turning restriction portion, and
wherein turning of the operation member is restricted by the side surface portion or an end surface of the bottom surface portion opposing the turning restriction portion.

13. The brake pedal structure for a saddled vehicle according to claim 4,
wherein the turning restriction portion has a shape of arranging a step on a side wall of the holder,
wherein the operation member is configured to arrange a bottom surface portion and a side surface portion by bending a plate-like member, the bottom surface portion abutting upon the side wall, the side surface portion abutting upon the turning restriction portion, and
wherein turning of the operation member is restricted by the side surface portion or an end surface of the bottom surface portion opposing the turning restriction portion.

14. The brake pedal structure for a saddled vehicle according to claim 5,
wherein the turning restriction portion has a shape of arranging a step on a side wall of the holder,
wherein the operation member is configured to arrange a bottom surface portion and a side surface portion by bending a plate-like member, the bottom surface portion abutting upon the side wall, the side surface portion abutting upon the turning restriction portion, and
wherein turning of the operation member is restricted by the side surface portion or an end surface of the bottom surface portion opposing the turning restriction portion.

15. The brake pedal structure for a saddled vehicle according to claim 6,
wherein the turning restriction portion has a shape of arranging a step on a side wall of the holder,
wherein the operation member is configured to arrange a bottom surface portion and a side surface portion by bending a plate-like member, the bottom surface portion abutting upon the side wall, the side surface portion abutting upon the turning restriction portion, and
wherein turning of the operation member is restricted by the side surface portion or an end surface of the bottom surface portion opposing the turning restriction portion.

16. The brake pedal structure for a saddled vehicle according to claim 3,
wherein the turning restriction portions are protrusions disposed on a side wall of the holder so as to form a concentric circle,
wherein engagement recesses are arranged in a bottom surface portion of the operation member, the engagement recesses matching a shape of the turning restriction portions, and
wherein turning of the operation member is restricted by engaging the turning restriction portions with the engagement recesses.

17. The brake pedal structure for a saddled vehicle according to claim 4,
wherein the turning restriction portions are protrusions disposed on a side wall of the holder so as to form a concentric circle,
wherein engagement recesses are arranged in a bottom surface portion of the operation member, the engagement recesses matching a shape of the turning restriction portions, and
wherein turning of the operation member is restricted by engaging the turning restriction portions with the engagement recesses.

18. The brake pedal structure for a saddled vehicle according to claim 5,
wherein the turning restriction portions are protrusions disposed on a side wall of the holder so as to form a concentric circle,
wherein engagement recesses are arranged in a bottom surface portion of the operation member, the engagement recesses matching a shape of the turning restriction portions, and
wherein turning of the operation member is restricted by engaging the turning restriction portions with the engagement recesses.

19. The brake pedal structure for a saddled vehicle according to claim 6,
wherein the turning restriction portions are protrusions disposed on a side wall of the holder so as to form a concentric circle,
wherein engagement recesses are arranged in a bottom surface portion of the operation member, the engagement recesses matching a shape of the turning restriction portions, and
wherein turning of the operation member is restricted by engaging the turning restriction portions with the engagement recesses.

* * * * *